(12) United States Patent
Mathys et al.

(10) Patent No.: US 9,725,238 B2
(45) Date of Patent: Aug. 8, 2017

(54) STORAGE AND ORDER-PICKING SYSTEM COMPRISING A SHUTTLE

(71) Applicant: SSI Schafer Noell GmbH Lager- und Systemtechnik, Giebelstadt (DE)

(72) Inventors: Andre Mathys, Ennetburgen (CH); Rudolf Keller, Wollerau (CH)

(73) Assignee: SSI Schäfer Noell GmbH Lager- und Systemtechnik, Giebelstadt (DE)

( * ) Notice: Subject to any disclaimer, the term of this patent is extended or adjusted under 35 U.S.C. 154(b) by 698 days.

(21) Appl. No.: 13/972,198

(22) Filed: Aug. 21, 2013

(65) Prior Publication Data

US 2014/0056672 A1 Feb. 27, 2014

Related U.S. Application Data

(63) Continuation of application No. PCT/EP2012/052526, filed on Feb. 14, 2012.

(30) Foreign Application Priority Data

Feb. 21, 2011 (DE) .................... 10 2011 012 424

(51) Int. Cl.
*B65G 1/04* (2006.01)

(52) U.S. Cl.
CPC ......... *B65G 1/0492* (2013.01); *B65G 1/0407* (2013.01); *B65G 1/0485* (2013.01)

(58) Field of Classification Search
CPC ... B65G 1/0407; B65G 1/0485; B65G 1/0492
USPC ........................................................ 414/277
See application file for complete search history.

(56) References Cited

U.S. PATENT DOCUMENTS

| | | | | |
|---|---|---|---|---|
| 3,559,822 | A * | 2/1971 | Lichtenford ......... | B65G 1/0407 414/140.3 |
| 4,093,086 | A * | 6/1978 | Lucas ................. | B65G 1/0485 414/283 |
| 7,261,509 | B2 * | 8/2007 | Freudelsperger .... | B65G 1/1378 414/269 |
| 2006/0280581 | A1 * | 12/2006 | Castegren ............. | B66F 9/07 414/267 |

(Continued)

FOREIGN PATENT DOCUMENTS

| | | |
|---|---|---|
| DE | 201 12 328 U1 | 3/2002 |
| DE | 202 11 321 U1 | 2/2003 |

(Continued)

*Primary Examiner* — Michael McCullough
*Assistant Examiner* — Ashley Romano
(74) *Attorney, Agent, or Firm* — Renner, Otto, Boisselle & Sklar, LLP

(57) ABSTRACT

A system for storing and picking storage units including a rack arrangement having a plurality of racks, a plurality of rack-bound vehicles adapted to travel in a rack aisle for storing and retrieving the storage units into and from the storage locations in a transversal direction, wherein a rack-integrated lifter includes a load-handling device for transferring storage units between a rack-integrated handing-over location and at least one rack-integrated buffer location arranged only vertically beneath, or only vertically above, the handing-over location and at a transferring device for exchanging storage units between a feeding/discharging conveyor and the handing-over location.

22 Claims, 10 Drawing Sheets

(56) References Cited

U.S. PATENT DOCUMENTS

| | | | | |
|---|---|---|---|---|
| 2007/0041815 A1* | 2/2007 | Wirz | ................... | B65G 1/0407 |
| | | | | 414/288 |
| 2007/0144991 A1* | 6/2007 | Hansl | ................... | B65G 1/0407 |
| | | | | 211/121 |
| 2009/0028675 A1* | 1/2009 | Tsujimoto | ............ | B65G 1/0407 |
| | | | | 414/273 |
| 2013/0216337 A1* | 8/2013 | Rafols | ....................... | B66F 9/07 |
| | | | | 414/279 |

FOREIGN PATENT DOCUMENTS

| | | |
|---|---|---|
| DE | 10 2009 017 241 A1 | 10/2010 |
| EP | 0 322 539 A1 | 7/1989 |
| EP | 2 022 732 A2 | 2/2009 |
| WO | 2010/090516 A1 | 8/2010 |

* cited by examiner

STORAGE AND ORDER-PICKING SYSTEM COMPRISING A SHUTTLE

RELATED APPLICATIONS

This is a continuation application of the co-pending international application PCT/EP2012/052526 (WO 2012/113681 A1) filed on Feb. 14, 2012, which claims priority of the German patent application DE 10 2011 012 424.1 filed on Feb. 21, 2011, which are both incorporated by reference herewith.

BACKGROUND OF THE INVENTION

The present invention relates to a system for storing and picking storage units, in particular (small-parts) containers, in an automated manner by means of vehicles, which are also designated "shuttles". Further, the present invention relates to the vehicle itself as well as to a method for storing and retrieving.

RELATED PRIOR ART

In conventional warehousing racks are operated by means of storage and retrieval devices. Typically, a storage and retrieval device is movable in vertical and horizontal directions within a rack aisle, which is defined between two adjacent racks. The storage and retrieval device is provided with a load-handling device, wherein storage units are retrieved from (rack) storage locations and are delivered to storage locations by means of the load-handling device. Such an "operation" (supply) of the rack with storage units typically happens via a vertical elevator which is arranged at a front end to which the storage and retrieval device delivers storage units—most times by means of driven buffer lines—for the purpose of retrieval, or from which the storage and retrieval device retrieves storage units—again most times via the bypass of driven buffer lines—for the purpose of storage.

Typically, each rack aisle is provided with one single stationary vertical elevator, the load-handling device thereof being movable in the vertical direction only, which is supplied with storage units by means of a storage and retrieval device, or by means of several storage and retrieval devices without collisions which in this case are arranged vertically on top of each other. However, the vertical elevator at the front side of the rack aisle represents a narrow passage in terms of a "bottle neck" with regard to material flow. The (conveying) capacity of the vertical elevator represents the upper limit of the potentially possible storage and retrieval processes into and from the rack aisle. In dependence on the paths (heights), which are to be travelled by the vertical elevator for retrieving or delivering a storage unit, the performance is reduced additionally. The longer the paths are, the less storage units can be stored or delivered within a unit of time. As a matter of fact, the same applies with regard to paths, which need to be travelled by the storage and retrieval devices within the rack aisles for retrieving or delivering a storage unit at a front end. Of course, these factors also depend on the dimension of the rack. The higher the rack is, the longer the paths can be for the vertical elevator. The longer the rack or the deeper the rack aisle is, the longer the paths of the storage and retrieval devices can be.

A correspondingly structured system is described in the U.S. Pat. No. 7,261,509 B2.

According to another classical approach the supply of the rack happens only by means of one single storage and retrieval device in each rack aisle, which is typically guided in the ground and/or on the ceiling along one or more travelling rails. The storage units are transported via a feeding conveyor to the front side of the rack, or to the beginning of the rack aisle, where the storage units are retrieved by the storage and retrieval device. Storage units, which are to be retrieved, are transported by the storage and retrieval device to the front side of the rack, in order to be delivered to a discharging conveyor. These conveyors most times are arranged immediately adjacent to the front sides of the racks limiting the rack aisle, in order to keep the paths of the storage and retrieval device as short as possible. This arrangement of the conveyors is also called a pre-zone.

In order to decouple horizontal movements of the storage and retrieval device from vertical movements of the load-handling device thereof, it has already been suggested to use a plurality of so-called single-plane operating devices, instead of one single storage and retrieval device. Since a single-plane operating device has no lift, it supplies merely one single rack plane. Typically, the single-plane operating device is (two-sided) guided in a rack-bound manner, i.e. it travels on travelling rails being mounted in a horizontal direction to the racks in the rack aisle. Each of the rack planes is supplied by means of one single single-plane operating device. In this case, the vertical movement of the storage units in turn requires a vertical elevator arranged at the front end, which exchanges storage units with driven buffer lines on each of the rack planes. Even with this approach the vertical elevator represents the narrow passage with regard to material flow. Such a single-plane operating device is commercially available, for example, under the trademark "Multishuttle".

With another order-picking concept, as described in the patent application WO 2010/090515 A1, individual storage units such as packing units are concatenated to bigger storage units such as a pallet layer of packaging units are then moved onto special layer trays having ribbed bottoms for meshing interaction with load-handling devices of storage and retrieval devices, and are subsequently stored into racks on these layer trays. In this case, the layer trays are used as shelves. Individual packaging units are removed from there by means of other storage and retrieval devices, which can travel in horizontal and vertical directions in another aisle. These storage and retrieval devices are provided with a load-handling device comprising prongs (bars) which are retractable and extendable in the transversal direction (relative to the rack aisle). Then, retrieved packaging units are delivered to a discharging conveyor, which extends along the other rack aisle and is arranged oppositely to both the storage rack and the (other) storage and retrieval device.

With the above-described conventional storage and order-picking strategies it is disadvantageous that the picking performance (storage and retrieval processes per unit of time) often is not sufficient for satisfying the requirements of a (warehouse) operator. In this context several factors are important. One substantial factor is to be seen in the singular supply of the rack aisles, at the front end, with storage units, since always only one single vertical elevator, or one single storage and retrieval device, can be positioned there for picking up and delivering the storage goods. Another factor is to be seen in the utilization of one single storage and retrieval device for each rack aisle. The use of several storage and retrieval devices within the same rack aisle is not possible since the storage and retrieval devices are not capable of overtaking within the rack aisle.

The document DE 201 12 328 U1 discloses an order-picking system including a container warehouse and associated storage and retrieval devices.

SUMMARY OF THE INVENTION

Therefore, it is an object of the present invention to provide a storage and order-picking system, a method for storing and retrieving, as well as an operating device overcoming the above-mentioned disadvantages.

According to a first aspect of the invention it is disclosed a system for storing and picking storage units, in particular small-parts containers, in an automated manner, comprising: a rack arrangement having a plurality of racks, wherein each of the racks comprises several rack planes arranged on top of each other which in turn respectively include a plurality of storage locations arranged side by side, wherein a rack aisle is defined between first and second racks; a plurality of rack-bound vehicles adapted to travel in the rack aisle for storing and retrieving the storage units into and from the storage locations in a transversal direction, wherein each of the vehicles respectively comprises a carriage, at least one travel drive, and at least one load-handling device, wherein so many vehicles are provided in the rack aisle that each of the rack planes is operable by at least one load-handling device of one of the vehicles; characterized by at least one rack-integrated lifter including a load-handling device, wherein the load-handling device of the lifter is adapted to transfer storage units between a rack-integrated handing-over location, which is assigned to the at least one rack-integrated lifter, and at least one rack-integrated buffer location, wherein the at least one buffer location is arranged only vertically beneath, or only vertically above, the handing-over location; at least one conveyor, which protrudes into the rack aisle by means of a feeding/discharging conveyor, which there couples to the handing-over location and which conveys to-be-stored storage units towards the handing-over location and conveys to-be-retrieved storage units away from the handing-over location; and at least one transverse transferring device which is arranged and adapted to exchange storage units between the feeding/discharging conveyor and the handing-over location.

According to a second aspect of the invention it is disclosed a system for storing and picking storage units in an automated manner, comprising: a rack arrangement having a plurality of racks, wherein each of the racks comprises several rack planes arranged on top of each other which in turn respectively include a plurality of storage locations arranged side by side, wherein a rack aisle is defined between first and second ones of the racks; a plurality of rack-bound vehicles each configured to travel in the rack aisle for storing and retrieving the storage units into and from the storage locations in a transversal direction of the racks, wherein each of the vehicles respectively comprises: a carriage; at least one travel drive; and at least one load-handling device; wherein several ones of the vehicles are provided in the rack aisle such that each of the rack planes is operated by at least one load-handling device of one of the vehicles; at least one rack-integrated lifter including a load-handling device, wherein the load-handling device of the rack-integrated lifter is configured to transfer the storage units between a rack-integrated handing-over location, which is assigned to the at least one rack-integrated lifter, and at least one rack-integrated buffer location, wherein the at least one rack-integrated buffer location is arranged only vertically beneath, or only vertically above, the handing-over location; at least one conveyor, which protrudes into the rack aisle by means of a feeding/discharging conveyor, which there couples to the handing-over location and which conveys to-be-stored storage units towards the handing-over location and conveys to-be-retrieved storage units away from the handing-over location; and at least one transverse-transferring device which is arranged and configured to exchange the storage units between the feeding/discharging conveyor and the handing-over location.

The system of the invention allows integration of several lifters into the rack in a longitudinal direction X of the rack one behind the other. The lifters are supplied with storage units by means of a conveying system. The narrow passage, with regard to material flow, of the individual vertical elevator at the front side of the rack is omitted due to the plurality of lifters within the rack. The performance of the lifters (or the elevators) no longer represents the upper limit of storing and retrieval processes. A lot of lifters can be integrated into the rack so that even the transport performance of the conveyor is no longer sufficient to use each of the lifters to their capacities. In this case, the invention is nevertheless scalable in that several conveyors are provided, preferably at different heights. In each of the rack aisles several vehicles can be provided so that each of the rack planes is operable at least by a different load-handling device of the vehicles. If the racks, which are defining a rack aisle therebetween, thus respectively comprise, for example, four rack planes, the rack aisle can be operated (simultaneously) by two vehicles each including two load-handling devices, thereby allowing access to each of the four rack planes at the same time.

With a preferred embodiment each of the vehicles comprises at least one lifting carriage including a respectively assigned lifting drive, wherein the lifting carriage is vertically and movably supported in the carriage, and wherein the assigned lifting drive moves the lifting carriage vertically.

In this manner a single-plane operating device becomes a multi-plane operating device so that different rack planes can be operated by one and the same vehicle.

In particular, each of the vehicles can travel along the rack in a horizontal guidance, which preferably is mounted only to the first rack, or the second rack, and wherein the at least one load-handling device of each of the vehicles is horizontally attached, in a freely overhanging manner, to the lifting carriage, which is substantially orientated vertically, so that vehicles, which are arranged oppositely in the rack aisle at the same height, can cross during a longitudinal travel although the carriages of the vehicles, which are arranged oppositely at the same height, vertically overlap during the crossing, so that the load-handling devices overlap horizontally, i.e. the load handling devices cover almost the same area in a top view of the rack aisle.

Although the vehicles are operating a number of rack planes, they can cross within the rack aisle, i.e. pass each other. In particular, this is possible because the vehicles are preferably one-sidedly guided at longitudinal sides of the racks, which are facing the rack aisle. Due to the height-adjustment capability of the load-handling devices it is possible to position the load-handling devices including load such that the load-handling devices of the vehicles, which pass each other, do not collide. The lifting functionality of the load-handling devices has another advantage in that a vehicle, the load-handling device of which is also located at an assigned rack plane, can help out on an adjacent rack plane, if capacity utilization is insufficient, if the load-handling device (of another vehicle), which is assigned to this rack plane, is possibly overloaded. Peak loads can be balanced easily in this manner.

Further, it is preferred if the guidances of the vehicles, which are provided at the same height, are arranged at the same height at longitudinal sides of the first and second racks being arranged oppositely.

A mounting grid of guidances and longitudinal supports of the racks can be maintained so that the rack structure is less complex. The guidances can also be used as longitudinal supports of the rack for supporting, for example, shelves or the like.

Additionally, it is an advantage if each of the guidances comprises a profile, which is mounted in the horizontal longitudinal direction of the rack aisle to vertical rack uprights of the racks, which are facing the rack aisle.

The design of the rack structure does not need to be changed in comparison to conventional racks. Conventional racks can be retrofitted and converted for implementing the present invention.

Preferably, each of the guidances comprises a C-shaped profile, wherein one or more travelling wheels of one of the vehicles travel in an interior thereof and wherein preferably one or more supporting wheels of one of the vehicles, which is arranged vertically adjacent in the respective rack aisle, are guided along an exterior thereof.

Such a C-shaped profile has the advantage that one and the same C-shaped profile can be used for fixing and stabilizing two vehicles being arranged directly opposite in a vertical direction. The number of guidances, which need to be used in building, in order to support the vehicles within the rack aisles preferably in a one-sided hanging manner, is reduced to a minimum.

With another preferred embodiment the carriage has a frame and at least one travelling wheel, which is coupled to the travel drive, and at least one supporting wheel, which preferably is supported in a free-rotating manner, wherein the at least one travelling wheel is arranged in an upper half of the carriage, and wherein the at least one supporting wheel is arranged in a lower half of the carriage.

The forces, which are transmitted due to the movement of the vehicle, in particular due to the one-sided support on the rack, onto the rack by means of the motion of the vehicle are distributed to as many as possible contact points. Preferably, the contact occurs via the travelling wheels, guiding wheels, and/or supporting wheels. The wheels are distributed over the carriage so that a built-up of the vehicle, in particular in stop situations, is avoided. If the carriage sways, although the vehicle is actually stopped, important cycle time for storing and retrieving is lost because one needs to wait until the vehicle is completely at rest. Only then vehicle fine positioning relative to the rack location can be conducted. However, if the vehicle does not sway, exchange of storage units can be conducted immediately.

Preferably, the at least one travelling wheel rotates on a horizontally orientated axis, and the at least one supporting wheel rotates on a vertically orientated axis.

The vehicles are hanging downwardly on the travelling wheels and are orientated independently due to gravity. However, if a collision between the lower part of the carriage and the racks is to occur, this is prevented by the support wheels.

With a preferred embodiment the at least one lifter is arranged in the second rack in a first rack column, which is arranged adjacent to a second rack column in the second rack, in which the handing-over location and the least one buffer location are arranged.

With this embodiment exchange of storage units between the lifter and the transfer locations, as well as between the lifter and the buffer locations, occurs in the longitudinal direction of the rack. The combination of lifters and the transfer and buffer locations can be integrated into single racks and makes the provision of double racks superfluous. Less space is lost in the transversal direction Z.

Further, it is advantageous if an additional lifter is arranged in a third rack column of the second rack, which is arranged adjacent to the second rack column in the longitudinal direction.

Thus, two lifters are located within the same rack. The transport performance in the vertical direction is doubled, although the storage units are supplied and discharged via one rack aisle only. Further, it is possible that one of the lifters stores while the other lifter retrieves, wherein both of the lifters access the same transfer location. This in turn allows utilization of the feeding/discharging conveyors in the rack aisle for storing as well as retrieving. Also, it is possible to use both of the lifters exclusively for storing or exclusively for retrieving, thereby doubling the throughput in the vertical direction.

With another preferred embodiment the handing-over location and the at least one buffer location are adapted to mesh in the longitudinal direction with the load-handling device of the at least one lifter.

Further, it is preferred that the at least one buffer location is further adapted to mesh with the load-handling devices of the vehicles in the transversal direction.

With another preferred embodiment the handing-over location comprises a transverse transferring device, which is adapted to move storage units in the transversal direction without colliding with the load-handling device of the at least one lifter.

With still another embodiment of the invention the at least one lifter is arranged in a third rack, which is arranged back-to-back to the second rack, wherein the handing-over location and the at least one buffer location are arranged in the second rack and are arranged oppositely to the at least one lifter in the third rack in the transversal direction.

Due to this arrangement of the lifters and the transfer and buffer locations no storage locations are lost, which are arranged oppositely to the conveyor system within the aisles at the same height. With this kind of arrangement lifters and transfer locations are provided there as well.

With another advantageous embodiment the handing-over location and the at least one buffer location are adapted to mesh with the load-handling device of the at least one lifter and with the load-handling devices of the vehicles in the transversal direction.

With this embodiment the exchange of the storage units happens in the transfer direction Z only. This simplifies the design of the involved components.

With another advantageous embodiment in the third rack at least one additional lifter is arranged, which is arranged oppositely to an additional handing-over location and at least one additional buffer location in the second rack.

Here again the idea is expressed that several lifters, as well as several transfer and buffer locations, can be arranged one behind the other in the longitudinal direction for each of the racks, in order to increase the performance of the transport along the vertical direction.

Further, it is preferred if the transverse transferring device is one of a belt lifter, a roller comb, and a pusher.

Even further, it is preferred if each of the load-handling devices comprises prongs, which are retractable and extendable in a horizontal direction, and a lateral conveyor, wherein the prongs preferably can be retracted and extended individually.

The load-handling devices of the lifters and the vehicles can be formed identically. This increases the modularity of the overall system, because the costs of the load-handling devices (development, manufacturing, etc.) are significantly lower compared to systems utilizing a plurality of different components.

In particular, it is preferred to adapt the storage locations to mesh with the load-handling devices of the vehicles in the transversal direction.

Shelves having ribbed elevations can represent storage locations of this kind so that a meshing interaction between the load-handling devices and the storage locations is possible. The storage and retrieval are conducted, for example, by retracting and extending the prongs in combination with a lift (lifting during retrieval).

Preferably, each of the rack planes of the rack including a lifter either comprises a transfer location or a buffer location.

The more buffer locations are provided in the rack column, where the transfer location is arranged as well, the more possibilities the lifter has to deliver or pick up a storage unit. In this context, it is not necessarily required that a to-be-stored storage unit is delivered at the level of rack plane into which the to-be-stored storage unit is to be stored. Due to the lifting function of the shuttle, these storage units can also be retrieved from adjacent buffer locations.

According to third aspect of the invention it is disclosed a vehicle, wherein the vehicle comprises: a carriage substantially extending along a longitudinal side of a rack, along which the vehicle can travel and which defines a rack aisle together with an oppositely arranged rack; at least one travel drive; a lifting carriage being vertically and movably supported in the carriage; a lifting drive for vertically moving the lifting carriage relative to the carriage; at least one load-handling device being respectively mounted to the lifting carriage in a freely hanging manner so that vehicles, which are operating identical rack planes in the rack aisle and which are guided at the same height on oppositely arranged longitudinal sides of the racks, can cross during a longitudinal travel, and wherein feeding and/or discharging conveyors can be overtravelled or undertravelled, which are reaching into the rack aisle.

These vehicles allow performance of several storage and retrieval processes within the same rack plane at the same time. Further, the vehicles are allowed to meet in the rack aisle during a longitudinal travel without colliding. Further, the vehicles are allowed to overtravel or undertravel the conveyors for the purpose of storage and retrieval, which are reaching into the rack aisles. The vehicles can be used on demand in different rack planes at the same time, wherein the advantages of single-plane operating devices are kept.

Preferably, each of the load-handling devices in orientated in a horizontal plane and comprises prongs, which are, preferably individually, retractable and extendable in the transversal direction, as well as at least one, preferably laterally arranged, transverse conveyor.

Storage units can be delivered by the load-handling device towards the rack by means of the transverse conveyors without extending the prongs. The load-handling device can reach into the rack by means of the prongs, in order to retrieve storage units from there. Thus, the transfer of storage units is possible without problems in both directions (storage and retrieval). In this context, the prongs are preferably arranged at a height, which is located beneath the transport plane of the transverse conveyor. If a storage unit is retrieved, the prongs are extended beneath the to-be-retrieved storage unit, the load-handling device is slightly lifted, and the prongs are subsequently retracted again, wherein the transverse conveyor is driven, preferably at the latest, as soon as the to-be-retrieved storage unit gets into contact with the transverse conveyors. In this manner the to-be-retrieved storage unit is lowered onto the transverse conveyor.

Further, it is advantageous if each of the load-handling devices additionally comprises a lateral guidance, which is adjustable in a longitudinal direction, the lateral guidance preferably comprising a pair of pushers, wherein each of the pushers substantially extends in a vertical transverse plane perpendicular relative to the longitudinal direction.

The lateral guidance ensures that to-be-stored storage units can be positioned exactly in the longitudinal direction in the storage locations. Further, the lateral guidance of the load-handling device of the vehicles prevents the storage units from slipping off during a longitudinal travel in the rack aisle, which can happen at quite high velocities. At the same time the lateral guidance prevents the storage units from slipping off during a break of the vehicle.

With an advantageous embodiment the carriage comprises travelling wheels and supporting wheels.

Due to the provision of travelling and supporting wheels the carriages can be supported in a one-sided manner on the racks. This allows the crossing of vehicles, which are arranged in the rack aisle at the same height.

Further, it is preferred to support the travelling wheels in an upper half of the carriage, and preferably to rotate on an axis in the transversal direction, and wherein the supporting wheels are supported in a lower half of the carriage, and preferably rotate on an axis in the vertical direction.

With another preferred embodiment the travelling wheels are positioned inside of and the supporting wheels are attached outside of guidance profiles oppositely arranged at the same height, which preferably have a C-shape, while the vehicle travels in the rack aisle.

Thus, the guidance profiles have a double function. On the one hand they serve as travelling rails for the travelling wheels. On the other hand they serve as supporting rails for the supporting wheels. In this manner the number of rails, which need to be used in building in a rack aisle for safely guiding the vehicles, can be reduced significantly.

With another preferred embodiment each of the vehicles has two or more load-handling devices, which respectively have a distance to each other in the vertical direction so that correspondingly distanced load-handling devices of another vehicle, which operates identical rack planes in the rack aisle, can cross each other without collisions during a longitudinal travel.

Further, it is advantageous if each of the load-handling devices has a separate lifting drive, in order to be movable in the vertical direction individually.

If each of the load-handling devices is individually movable, more storage locations can be travelled-to during storage and retrieval in comparison to rigidly connected load-handling devices. In this way the likelihood that the load-handling devices exchange storage units with the rack, during a stop of the vehicle, is again increased.

Additionally, it is advantageous if each of the load-handling devices is connected to the lifting carriage by means of at least one cantilever arm.

According to a fourth aspect of the invention it is disclosed a method for storing a storage unit in a rack having several rack planes, which are arranged on top of each other and which respectively comprise several storage locations being arranged side by side, by means of a feeding/discharging conveyor, which protrudes into a rack aisle and couples to at least one rack-integrated handing-over location, wherein each of the rack planes is operated by at least one load-handling device of a vehicle, the method comprising the steps of: feeding a storage unit via the feeding conveyor; moving the fed storage unit from the feeding conveyor to the rack-integrated handing-over location in a transversal direction by means of a transverse transferring device, which is movable into a conveying path of the feeding conveyor; retrieving the storage unit from the rack-integrated handing-over location in a longitudinal direction, or in the transversal direction, by means of a rack-integrated lifter, wherein a load-handling device of the lifter is extended horizontally into the rack-integrated handing-over location, is subsequently lifted vertically, and then is retracted horizontally, wherein a conveyor, which is part of the load-handling device of the lifter, is preferably operated simultaneously; moving the retrieved storage unit in the vertical direction by means of the rack-integrated lifter; delivering the retrieved storage unit in the longitudinal direction, or the transversal direction, to a rack-integrated buffer location, which is arranged above, or beneath, the rack-integrated handing-over location, wherein the rack-integrated buffer location is assigned to a storage rack plane, wherein the rack-integrated buffer location is arranged at the height of the storage rack plane, or adjacent thereto, wherein the conveyor of the load-handling device of the lifter is operated as soon as the lifter has arrived at the height of the rack-integrated buffer location; retrieving the storage unit from the rack-integrated buffer location by means of one of the vehicles, wherein the vehicle horizontally travels in the rack aisle along the rack to a rack column comprising the rack-integrated handing-over location and the rack-integrated buffer location, and wherein a load-handling device of the vehicle is moved vertically, if necessary, to the height of the rack-integrated buffer location, and wherein the load-handling device of the vehicle is subsequently extended horizontally, lifted vertically, and then retracted again, preferably while a conveyor, which is part of the load-handling device of the vehicle, is operated simultaneously; moving the vehicle in a horizontal direction to another rack column, which comprises the storage location, and, if necessary, vertically moving the load-handling device of the vehicle to the height of the storage location; and operating the conveyor of the load-handling device of the vehicle such that the storage unit is placed on or in the storage location.

According to fifth aspect of the invention it is disclosed a method for storing a storage unit in a rack, the rack comprising several rack planes which are arranged on top of each other and which respectively comprise several storage locations being arranged side by side, by means of a feeding/discharging conveyor, which protrudes into a rack aisle and couples to at least one rack-integrated handing-over location, wherein each of the rack planes is operated by at least one load-handling device of a vehicle, the method comprising the steps of: feeding a storage unit via the feeding conveyor; moving the fed storage unit from the feeding conveyor to the rack-integrated handing-over location in a transversal direction by means of a transverse transferring device, which is movable into a conveying path of the feeding conveyor; retrieving the storage unit from the rack-integrated handing-over location in a longitudinal direction, or in the transversal direction, by means of a rack-integrated lifter, wherein a load-handling device of the rack-integrated lifter is extended horizontally into the rack-integrated handing-over location, is subsequently lifted vertically, and then is retracted horizontally; moving the retrieved storage unit in a vertical direction by means of the rack-integrated lifter; delivering the retrieved storage unit in the longitudinal direction, or the transversal direction, to a rack-integrated buffer location, which is arranged above, or beneath, the rack-integrated handing-over location, wherein the rack-integrated buffer location is assigned to a storage rack plane, wherein the rack-integrated buffer location is arranged at the height of the storage rack plane, or adjacent thereto, wherein a conveyor of the load-handling device of the rack-integrated lifter is operated as soon as the lifter has arrived at the height of the rack-integrated buffer location; retrieving the storage unit from the rack-integrated buffer location by means of one of the vehicles, wherein the vehicle horizontally travels in the rack aisle along the rack to a rack column comprising the rack-integrated handing-over location and the rack-integrated buffer location, wherein a load-handling device of the vehicle is moved vertically, if necessary, to the height of the rack-integrated buffer location, and wherein the load-handling device of the vehicle is subsequently extended horizontally, lifted vertically, and then retracted again, moving the vehicle in a horizontal direction to another rack column, which comprises the storage location, and, if necessary, vertically moving the load-handling device of the vehicle to the height of the storage location; and operating a conveyor of the load-handling device of the vehicle such that the storage unit is placed on, or in, the storage location.

BRIEF DESCRIPTION OF THE DRAWINGS

It is clear that the above-mentioned hereinafter still to be explained features can not only to be used in the respectively given combination but also in other combinations or alone, without departing from the scope of the present invention.

Embodiments of the invention are depicted in the drawings and will be explained in more detail in the following description, wherein.

PREFERRED EMBODIMENTS OF THE INVENTION

Figure 1:
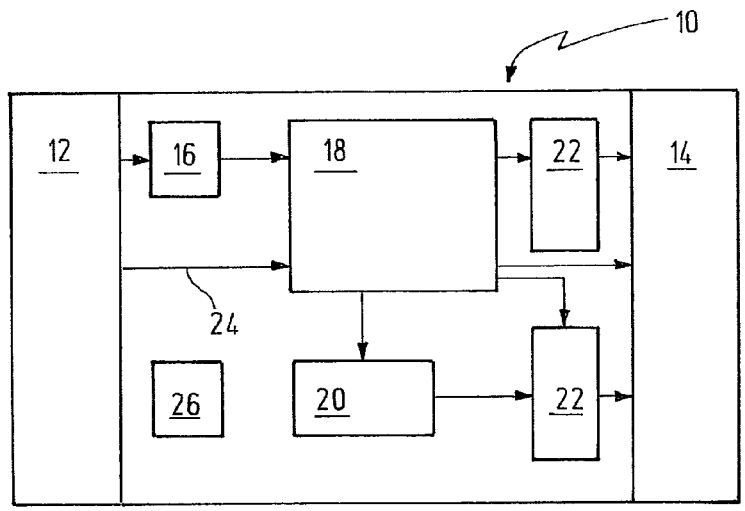
FIG. 1 shows a block diagram of a storage and order-picking system in accordance with the invention.

In the following description of the figures identical features have been designated by identical reference numerals. Modifications are designated by similar reference numerals. The reference numeral 10 generally designates a storage and order-picking system in accordance with the present invention.

If vertical and/or horizontal orientations are mentioned in the following, it is clear that the orientations can be exchanged against each other at any time by means of a rotation, and therefore are not to be interpreted in a limiting manner.

A storage and retrieval device (also abbreviated as "SRD") is to be understood in the following as a conveying unit, or operating unit, which typically travels in a rack aisle between two racks, most times in a rail-guided manner. Typically, an SRD comprises a carriage, one or more masts, a lift hoist, as well as at least one load-handling device. The mast can be guided on an upper guidance rail and/or can be connected to a traverse at the ground, which transmit the forces by means of supporting and guiding rollers. Drives are often implemented in terms of friction drives or toothed-belt drives. Frequently, a lifting drive of the SRD is implemented by means of a circulating traction device such as toothed belts, chains, or ropes. An omega-travel drive, which is carried with, is suitable for higher accelerations, wherein the SRD is pulled along a toothed belt by means of a driving pulley. The picking up of loads happens, e.g. if pallets are used, by means of a telescopic fork, and if containers are used by means of a rotating belt conveyor, by retracting by means of a traction device (e.g., hook, lasso, or pivotal arm), or by means of a lifting platform.

A storage unit is to be understood in the following as a handling unit which is particularly used in a storage region (rack). A storage unit typically holds articles of one type only, but can also be mixed. The storage unit can also include a load support as well as the storage good itself. However, the storage unit can also be represented by the storage good alone, if the load support is omitted. For example, pallets, mesh boxes, containers, totes, cartons, trays, and the like are typically used as the load supports. Storage goods include piece goods, bulk materials, fluids, or gases. Bulk materials, fluids, and gases require packages for the further handling, in order to define packaging goods. In the following, empty and filled totes are exemplarily used as the storage units. It is clear that each explication, which applies to the containers, can be used analogously for other storage units such as cartons or other packaging units as well.

A rack arrangement (e.g., a rack warehouse) typically includes a plurality of racks which are provided in terms of single racks, or double racks. Double racks are single racks arranged back to back. Rack aisles are defined between the racks, which typically extend in a longitudinal direction of the racks and are used as action space of SRD. The racks end at their respective oppositely arranged front sides, which in turn are orientated in a plane perpendicular to the longitudinal direction of the rack aisles. The racks comprise a plurality of (rack) storage locations, which are arranged in rack planes on top of each other. A rack column extends in a vertical direction within a rack and typically comprises as many storage locations on top of each other as rack planes exist.

A vertical elevator, or lifter, is to be understood in the following as a storage-unit handling unit including a load-handling device which is movable in the vertical direction only, and thus can be used only for overcoming height differences. A vertical elevator, or lifter, is arranged stationary relative to the racks, in contrast to the SRD.

A vehicle, or shuttle, is to be understood in the following as a storage and retrieval device which substantially operates one (single) rack plane, in order to supply storage units to the storage locations of this rack plane, i.e. to store and retrieve storage units.

FIG. 1 shows a block diagram of a storage and order-picking system 10 of the invention. The system 10 can comprise a goods-receipt area 12, a goods-issue area 14, one or more separating stations 16, a rack arrangement 18, one or more packaging and/or shipping stations 22 including an optional sorting device 20 which is connected thereto. The different elements 12 to 22 of the system 10 are connected to each other, with regard to material flow, by means of one or more conveyors (or conveying system) 24, as indicated in FIG. 1 by means of arrows. The control of the system 10 is conducted by means of one or more control units 26 (warehouse management computer, material flow computer, etc.), which communicate wired and/or wireless with the elements 12 to 24 as well as subunits thereof (drives, SCS, switches, light barriers, other actuators, and the like).

An exemplary material flow will be described hereinafter by means of an example in terms of (small parts) containers in the system 10, which are not depicted in FIG. 1, wherein the containers are stored and retrieved in and from an automated small-parts warehouse (SPW).

A group of containers is delivered to the goods-receipt area 12. Stacks of containers can be separated into individual containers at the separating station 16. In the goods-receipt area 12 articles, or products, which are contained in the containers, can be identified and communicated to the control unit 26 for the purpose of inventory and storage-location management. Loose articles, or products, can be additionally repacked into containers in the goods-receipt area 12, in order to be stored subsequently in the rack arrangement 18 (e.g., SPW). Stored containers are retrieved in accordance with picking orders. A picking order corresponds to one or more customer orders, and typically contains several order positions in terms of order lines. Each order line determines a type of product, or article, as well as a required number of this product type, or article type. The orders are collected in the packaging and/or shipping stations 22. If the sequence, in which the ordered products, or articles, are shipped to the customer, is important and if the containers are not yet retrieved already in the proper sequence from the rack arrangement, one or more storing devices 20 can be interconnected between the packaging and/or shipping station(s) 22 and the rack arrangement 18. Completely picked orders are brought from the packaging and/or shipping stations 22 into the goods-issue area 14, where they are transported to the respective customer.

Figure 2:
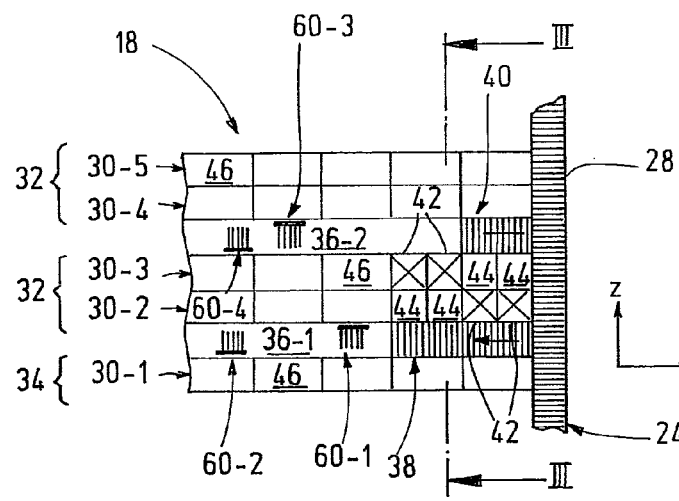
FIG. 2 shows a top view of a partially depicted first rack arrangement.

FIG. 2 schematically shows a partial top view of the rack arrangement 18 of FIG. 1.

The rack arrangement 18 comprises a number of racks 30. The racks 30 are orientated in a longitudinal direction X. A front side of the rack arrangement, or of the racks 30, which is shown at the right-hand side in FIG. 2 (and is not designated in more detail), is located in a plane YZ, which is orientated perpendicular to the longitudinal direction X. The axis Z represents the transversal direction, and the axis Y represents the vertical direction (height).

Five racks 30-1 to 30-5 are exemplarily shown in FIG. 2. The rack pairs 30-2, 30-3, 30-4, 30-5 respectively represent a double rack 32, and the rack 30-1 is single rack 34. Between the racks 30-1 and 30-2 a first rack aisle 36-1 is defined. Between the racks 30-3 and 30-4 a second rack aisle 36-2 is defined.

The rack arrangement 18 of FIG. 2 is supplied with storage units, in terms of a material flow, by a conveyor 24 in terms of a roller conveyor 28, wherein the storage units are presently not illustrated. The roller conveyor 28 extends along the front side of the racks 30, and can couple to a feeding conveyor 38 and a discharging conveyor 40, which are respectively orientated perpendicular to the roller conveyor 28 in the region of the front sides. The conveyors 38 and 40 respectively reach into the rack aisles 36-1 and 36-2. It is clear that the conveying directions, which are indicated by means of dark arrows, can be orientated arbitrarily. By inverting the conveying direction, the feeding conveyor 38 can be converted into a discharging conveyor 40. The same applies with regard to the discharging conveyor 40. The conveyors, or conveying system components, 28, 30, and 40 are arranged in the example of FIG. 2 at a uniform height, preferably in a region of 700 to 800 mm. The conveyor 24 is adapted to transport about 1,500 storage units each hour without problems. It is clear that the conveyor shown in FIG. 2 can be exchanged by other conveyor types (chain conveyors, overhead conveyors, belt conveyors, etc.). As a matter of fact, other conveyor types can be added to the conveyors as well.

The racks 30 can be implemented by racks 30 having shelves, lateral support angles, or the like, which are not designated in more detail. Preferably, shelves having rib-shaped elevations are used, which extend in the transversal direction Z and interact in a meshing manner with the preferably prong-shaped load-handling devices of the operating devices. An advantage of the utilization of shelves is the free storage-location partitioning. Shelves typically have a length of 200 to 300 cm so that differently dimensioned (standard) storage units can be stored without problems. The size of one storage location is, in case of ribbed shelves, only defined by the grid pitch of the rib-shaped elevations. These advantages particularly pay off with a dynamic storage-location management wherein a storage-location management software (control unit 26) again and again dynamically assigns position and size of a storage location, i.e. particularly in accordance with demands.

Single-deep storage and retrieval of storage units will be substantially described below. As a matter of fact, storage units can also be stored and retrieved in a multiple-deep manner. This substantially depends on the dimensions of the storage locations and the load-handling devices. It is clear that processes, which are only described in the light of single-deep storage, can be scaled without problems to multiple-deep storage by forming, for example, the storage locations correspondingly deep and forming the load-handling devices correspondingly long in a handling direction.

In FIG. 2 the racks 30-1, 30-4 and 30-5 are exemplarily used for storing storage units only, since no vertical elevators are provided there. However, in the racks 30-2 and 30-3 respectively two lifters 42 are integrated into the respective racks 30-2 and 30-3, i.e. into the respective rack row instead of the storage locations which are normally provided there. Respectively one handing-over location 44 is arranged oppositely to the lifters 42 in the adjacent racks 30-2 and 30-3. Two handing-over locations 44, which are arranged side by side, substitute one storage location 46 in FIG. 2, which is implemented, for example, by one of the above-described shelves. Such a shelf exemplarily has the size of two standard storage units, which are arranged in the longitudinal direction X, so that each of the handing-over locations 44 and each of the load-handling devices 42 can respectively handle a standard storage unit in the example of FIG. 2. As already mentioned, a lifter 42 is to be understood as a stationary storage-unit handling unit, which transports the storage units in the vertical direction Y only. In contrast to the conventional vertical elevators, however, the lifters 42 are integrated into the racks 30, or into the rack structure. Each of the lifters 42 comprises at least one load-handling device. For example, if two load-handling devices are provided on top of each other, a vertical partitioning of the load-handling devices can correspond to the partitioning of the feeding and/or discharging conveyors 38 and 40.

Figure 3:
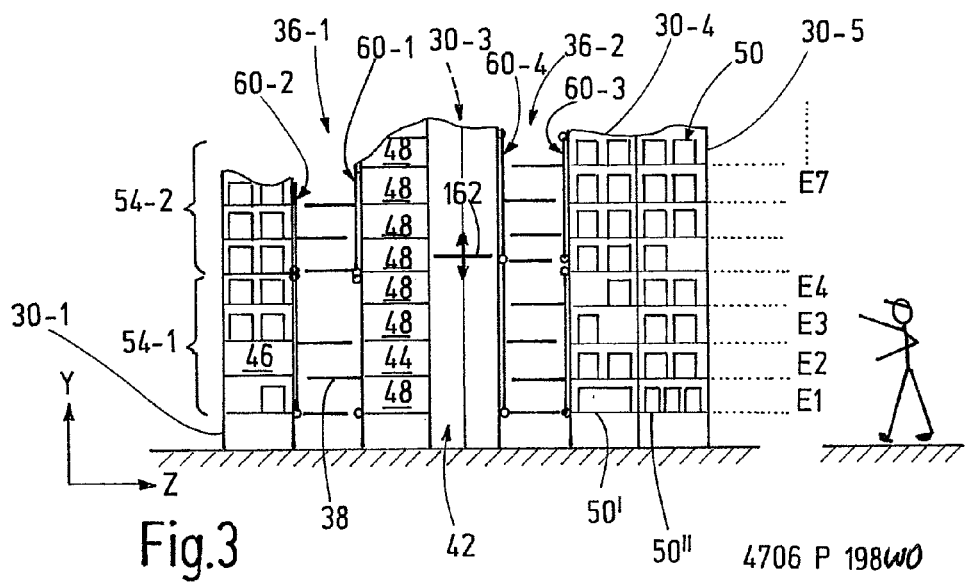
FIG. 3 shows a partial view of a front side of the rack arrangement of FIG. 2.

With reference to FIG. 3 a sectional view along the line III-III in FIG. 2 is shown. In FIG. 3 the rack aisles 36-1 and 36-2 are observed along the longitudinal direction X. The illustration of FIG. 3 slightly deviates from the one of FIG. 2 by explicitly showing double-deep storage in the racks 30 of FIG. 3. The racks 30 respectively comprise several rack planes $E_i$ on top of each other in the vertical direction Y, wherein the numbers start at the lowermost rack plane $E_1$. Most of the storage locations 46 of the rack plane $E_i$ are double-deep occupied by storage units 50 in FIG. 3. In FIG. 3 only one storage location 46 is completely free in the first rack 30-1. Single storage locations are sporadic free, as illustrated in the planes $E_1$ of rack 30-1, $E_3$ and $E_4$ of the rack 30-4, and $E_5$ of the rack 30-5. For example, one longer storage unit 50' and three shorter storage units 50" are indicated in the first plane $E_1$ of the racks 30-4 and 30-5.

The sectional view of FIG. 3 clearly shows the lifter 42 in the rack 30-3, which is arranged a the front relative to the front side and which replaces one rack column, instead of the shelves typically provided there.

The feeding conveyor 38 is formed single-deep and couples to the handing-over location 44 in the rack 30-2. Thus, two storage units 50 are fed for double-deep handling in the longitudinal direction X one behind the other via the feeding conveyor 38 and are transferred one behind the other to the handing-over location 44, as will be explained in more detail below. The transport of the storage units 50 in the longitudinal direction X is performed on the feeding conveyor 38. The handing over to the handing-over location 44 happens in the transversal direction Z. The lifter 42 retrieves the storage unit 50 (or storage units 50) in the transversal direction Z from the handing-over location 44 by means of the load-handling device thereof, which will be described in more detail with reference in particular to the FIGS. 4 to 6, and moves the retrieved storage units 50 in the vertical direction Y to the height of a default storage rack plane $E_i$ (or to the height of an immediately adjacent rack plane $E_j$), and delivers the retrieved storage units 50 to a buffer location 48 at this height. The delivery happens analogously to the pickup in an inverted sequence of motion steps.

The buffer locations are arranged above and/or beneath the handing-over location 44 in a rack column of the rack 30-2. The buffer locations 48 can replace all of the (standard) storage locations, or only some thereof, above and beneath the handing-over location 44. Preferably, the handing-over location 44 and the buffer locations 48 form a tower-like column (rack column), which does no longer comprise (standard) storage locations. The buffer locations 48 preferably do not comprise, in contrast to the handing-over location 44, conveying-system components for moving storage units 50, which are placed there, towards the lifter 42, or towards a feeding conveyor 38 or a discharging conveyor 40. Costs can be saved in this manner, which occur in the context of the conventional buffer (conveying) lines.

It is clear that also a number of handing-locations 44 can be present in one and the same column (rack column), if a number of conveyors 38 and/or 40 laterally couple to the column at different heights. For example, this can be the case if several storage/retrieval planes exist. In FIG. 3 one single storage plane at the height of the second rack plane $E_2$ is shown. However, it is also possible to supplementary provide one additional feeding conveyor 38, for example, at the fifth rack plane $E_5$ above the feeding conveyor 38 shown in FIG. 3.

Another particularity of the rack arrangement 18 as shown in FIGS. 2 and 3 is to be seen in the vehicles 60, which will be called shuttles as well and which function as operating devices which can substantially travel in the longitudinal direction X for supplying a rack plane $E_i$, which is respectively assigned thereto. In each of the rack aisles 36 a number of vehicles 60 are operated at the same time. In the rack aisle 36-1 two shuttles 60-1 and 60-2 as well as another shuttle (cf. FIG. 3) are illustrated. Beside the shuttles 60-3 and 60-4 additional shuttles are operated in the rack aisle 36-2, as exemplarily indicated in FIG. 3. Each of the shuttles 60 comprises, for example, two load-handling devices which will be described in more detail below. The shuttles 60 can be one-sidedly suspended at longitudinal sides 138 of the racks 30 and can travel in the longitudinal direction X in the rack aisle 36. Preferably, the load-handling devices have a vertical distance to each other so that they can simultaneously operate first and third, or second and forth, rack planes of a rack module 54, which covers four rack planes $E_1$ to $E_4$ in the example of FIG. 3. The shuttle 60 can store and retrieve storage units 50 into and from both racks 30 adjacent to the rack aisle 36, in which the shuttle 60 is operated. The (vertical) distance of the load-handling devices of the shuttles 60 preferably is constant and preferably corresponds to the multiple of a (standardized) rack-plane distance 94. The load-handling devices of the shuttles 60 can be formed in a vertically movable manner so that shuttles, which are oppositely arranged at the same height such as the shuttles 60-1 and 60-2 in the rack aisle 36-1, can supply all of the rack planes $E_i$ of a rack module 54, which is assigned thereto, with storage units 50. If the shuttles 60-1 and 60-2 cross, i.e. meet and/or overtake each other, in the rack aisle 36-1 during a longitudinal travel, i.e. during a simultaneous movement of both shuttles 60-1 and 60-2 in the longitudinal direction X, the shuttles 60-1 and 60-2 can pass each other without collision by displacing the load-handling devices thereof about the height 94 of one rack plane relative to each other, as shown for the shuttles 60 in the rack aisle 36-2 in FIG. 3. In this manner it is possible that the shuttles 60 can undertravel and/or overtravel the conveyors 38 and 40 within the rack aisles 36.

The possibility that shuttles 60 can cross within the same rack aisle 36, while they are equipped at the same time with a lift about the height of at least one rack plane $E_i$, additionally allows simultaneous access on storage units 50 of the same rack plane $E_i$. This applies with regard to both storage and retrieval processes. However, the same applies with regard to the exchange of storage units 50 relative to the storage locations 48. It is possible that the shuttle 60 retrieves a storage unit 50 from another rack plane $E_j$, in comparison to a rack plane to which the retrieved storage unit 50 is delivered, because the shuttle 60 has a lifting function. Thus, it is possible to store a storage unit 50 in a rack plane $E_i$, although the buffer location 48 on the same rack plane $E_i$ was empty. As a matter of fact, this also applies to retrieval processes.

Since one or more lifters 42 can be provided one behind the other in the longitudinal direction X of a rack 30, and in the transversal direction Z adjacent to correspondingly many handing-over locations 44 in an immediately adjacent rack 30, the (transport) performance is increased significantly. The "bottle neck" of a single lifter 42 (or vertical elevator) at the front side of the racks 30 can be eliminated by providing several lifters 42 in the racks 30. The more lifters 42 are used one behind the other in the longitudinal direction X, the longer the conveyor 38, or 40, extends into the rack aisle 36, as will be described below in more detail.

Returning to FIG. 3, hereinafter the description of a storing process is continued. After the lifter 42 has delivered the storage unit 50 to a predetermined buffer location 48, for example, to the buffer location 48 in the seventh rack plane $E_7$, the shuttle 60-1 can retrieve the storage unit 50, which is buffered there, by means of its upper load-handling device, can subsequently travel in the longitudinal direction X of the rack aisle 36-1 to the storage location (free storage location 46), and can place the to-be-stored storage unit 50 there in the transversal direction Z by means of the load-handling device thereof. It can be stored into both a storage location 46 in the rack 30-1 and in the rack 30-2. The storage can happen in the seventh rack plane $E_7$, but also in the eighth rack plane $E_8$. As a matter of fact, the same applies in an inverted sequence with regard to a retrieval process.

The conveyors 38 and 40 can be used as one-way streets, i.e. the rack aisle 36 is used for storing (only) and the other rack aisle 36 is used for retrieval (only). This is indicated in FIG. 2 by corresponding transport arrows, wherein the rack aisle 36-1 is used for storing and the rack aisle 36-2 is used for retrieval. In this context, the lifters 42 in the third rack 30-3 are used (preferably only) as storage elevators, and the lifters 42 in the second rack 30-2 are used as retrieval elevators (preferably only). If the functional unit consisting of the handing-over locations 44, buffer locations 48, and lifters 42, were continued in the racks 30-4 and 30-5, in particular if the arrangement is mirrored at the other end of the rack aisles 36, which is not shown, then it is clear that a first functional storing unit and a second functional retrieving unit can be used in one and the same aisle 36. However, typically each of the lifters 42 is used for storing and retrieving, wherein in this case in each of the rack aisles 36 a feeding conveyor 38 and a discharging conveyor 40 are present, but at different heights. For example, in FIG. 3 a discharging conveyor in the first rack aisle 36-1 can be provided at the height of the fourth rack plane $E_4$, in order to be able to perform both storing and retrieving in the first rack aisle.

Further, it is possible that the lifter 42 shown in FIG. 2 is formed such that the load-handling devices thereof can be operated in both transversal directions Z, i.e. positively and negatively. In this case the lifters 42 in the third rack 30-3 can also be used into the depth of the rack aisle 36-2 for retrieving, if the discharging conveyor 40 is continued in an extended manner. After these lifters 42 have delivered a to-be-stored storage unit 50 to a buffer location 48, which is shown in FIG. 3, they can receive a to-be-retrieved storage unit 50 directly from the shuttle 60-3 or 60-4, in order to take with the to-be-retrieved storage unit 50 on the way back to the foot of the lifter 42 to the level of the handing-over location 44 for delivering the storage unit 50 to the discharging conveyor 40 of the conveyor 24. As a matter of fact, the lifter 42 might also take with storage units 50 from the buffer locations 48, which have been placed onto this buffer location 48 for the purpose of retrieval before by means of the shuttle 60 in the rack aisle 30-1. With other words, this means that the lifters 42 in the FIGS. 2 and 3 can be used for both storing and retrieving. The same applies with regard to the shuttles 60, which will be described in more detail in the FIGS. 4A and 4B.

Figure 4A:
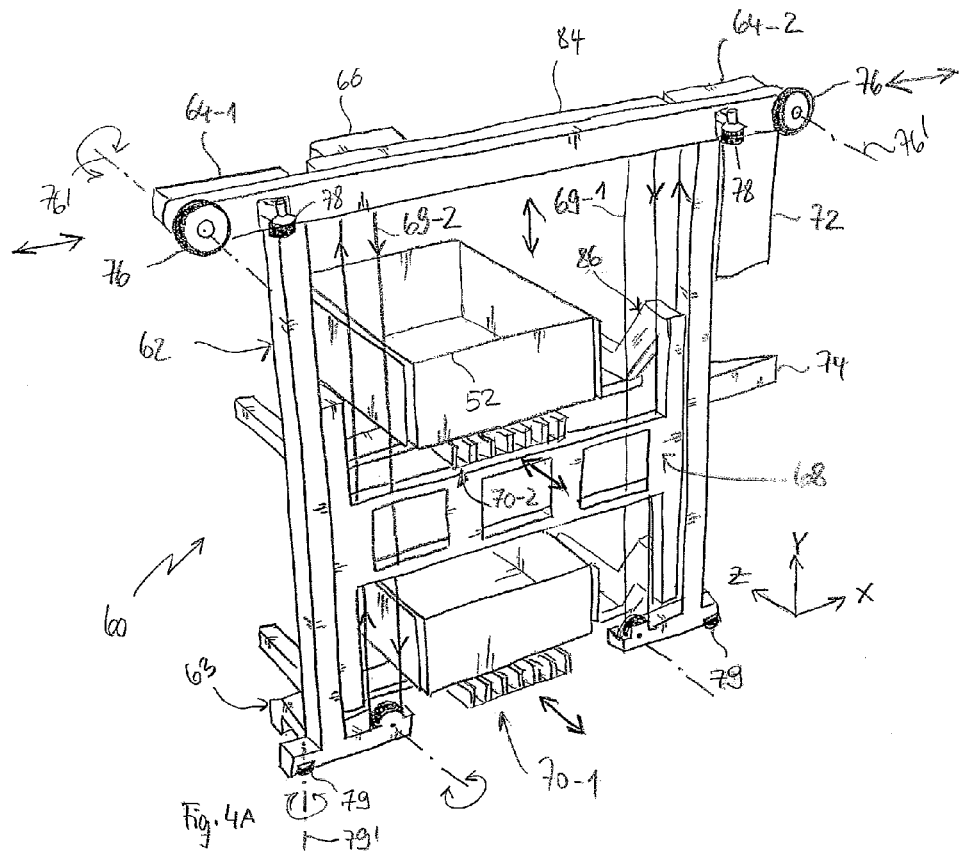
FIGS. 4A and 4B show a front view and rear view of a vehicle in accordance with the invention.
Figure 4B:
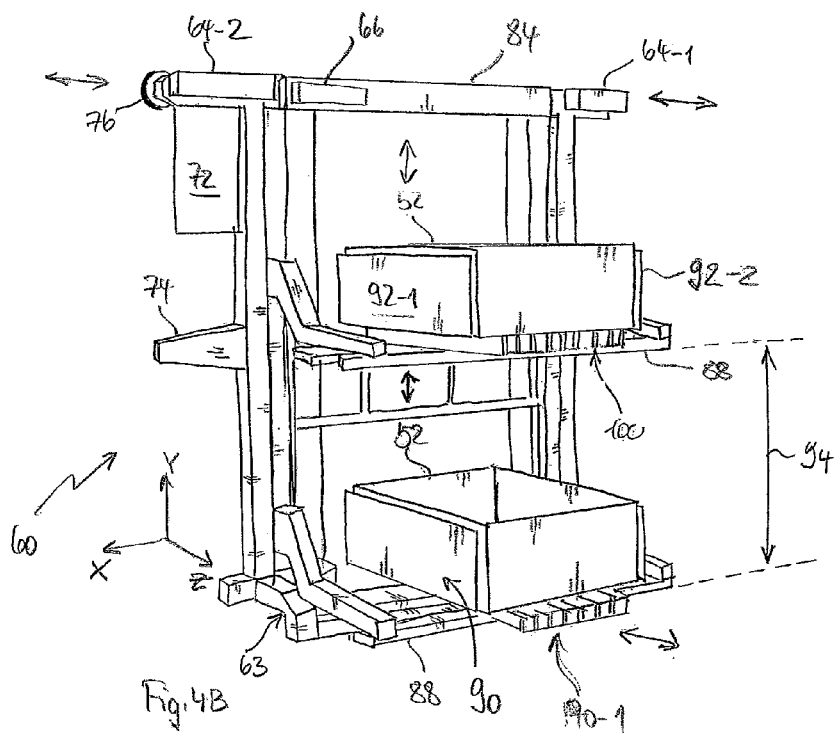

The FIGS. 4A and 4B show an embodiment of a vehicle 60, wherein FIG. 4A shows a back which is typically facing the rack 30, and FIG. 4B shows a front of the vehicle 60 which is typically facing the rack aisle 36. The shuttle 60 will be described below with common reference to FIGS. 4A and 4B.

The vehicle, or shuttle, 60 comprises a carriage 62, at least one travel drive 64, a lifting drive 66, a lifting carriage 68, traction devices 69, as well as one or more load-handling devices 70. In FIGS. 4A and 4B, for example, two load-handling devices 70-1 and 70-2 are shown, which have a distance in a vertical direction Y of the height of exemplarily two rack planes $E_i$ (see also arrow 94 in FIG. 4B). Further, the shuttle 60 can comprise a control unit 72, current taps 74, one or more travelling wheels 76, one or more guiding wheels 78, and/or one or more supporting wheels 79. The load-handling device 70 will be described in more detail with reference to FIGS. 5 and 6.

The carriage 62 is formed like a frame and can comprise three main legs, which are not designated in more detail and form, for example, a downwardly open "U", wherein the open ends are connected by a connecting element 63, which is overhanging in the transversal direction Z and which substantially extends in the longitudinal direction X. This overhanging connecting element 63 is formed so that it does not collide with a shuttle 60, which is provided at the same height on an adjacent rack 30, as exemplarily shown in the rack aisle 36-2 of FIG. 3.

The lifting carriage 68 can be formed like an H and is vertically supported in the carriage 62 in a movable manner. The lifting carriage 68 is used for receiving a load-handling device 70. Each of the load-handling devices 70 is connected to the lifting carriage 68 in the transversal direction Z in a freely overhanging manner by means of cantilever arms 86 extending substantially in the transversal direction Z. The load-handling devices 70 are sitting on longitudinal supports 88, which is turn are connected to the cantilever arms 86 and which substantially extend in the longitudinal direction X. Further, the lifting carriage 68 is fixedly connected to one or more traction devices 69 (e.g., chains, toothed belts, ropes, etc.), which are driven in the vertical direction Y by one or more lifting drives 66 in order to move the lifting carriage 68. The shuttle 60 of FIG. 4 is provided with one single lifting drive 66 only, which interacts with a drive 84 for driving both of the traction devices 69, which are fixed in regions of the lifting carriage 68 located externally in the longitudinal direction X, in order to transmit the lifting forces equally to the lifting carriage 68. If only one lifting drive 66 is provided for both of the load-handling devices 70-1 and 70-2, the load-handling devices 70-1 and 70-2 are synchronously lifted, or lowered, relative to the carriage 62. The vertical distance 94 between the load-handling devices 70 of one shuttle 60 preferably corresponds to an integer multiple of a height of one rack plane $E_i$. It is clear that the shuttle 60 can also comprise more or less than two load-handling devices 70-1 and 70-2 and that the distances between the load-handling devices 70 can also correspond, for example, to the height of three rack planes $E_i$. The load-handling devices do not need to be distanced symmetrically relative to each other in the vertical direction Y. However, they should be distanced to each other so that the load-handling devices 70 of an adjacent shuttle 60, which is located directly adjacent in the transversal direction Z in a rack aisle 36, can pass without collision. With other words this means that the (height-adjustable) load-handling devices 70 may only be positioned at such height levels where the adjacent shuttle currently does not have one of its load-handling devices.

Further, it is possible to provide a lifting drive 66 for each of the load-handling devices 70 so that the load-handling devices 70 can be moved individually in the vertical direction Y. In this case it is only to be considered during the crossing of the shuttles 60, with regard to the shuttle 60 adjacent in the direction Z, that not more load-handling devices are provided than rack planes of the module 54 are provided in sum.

The shuttles 60, which substantially extend in the vertical plane XY, travel in the longitudinal direction X of the rack aisle 36 in guidances 80, which are preferably arranged horizontally and which will be explained in more detail with reference to the FIGS. 7 to 9. The travelling wheels 76, two of which are arranged in an upper half of the carriage 62 in FIG. 4, can be driven respectively by means of a separate travel drive 64-1 and 64-2. It is clear that the drives 64-1 and 64-2 are synchronized to each other, at least by means of a corresponding control through the control unit 72, where also the travel-stop position and the like can be stored. Further, it is clear that the travelling wheels 76 can also be arranged in a lower half of the carriage 62, even supplementary. In this case, the shuttle 60 is not hanging on the rack 30 but stands on the rack 30. The travelling wheels 76 rotate on axes 76' orientated in the transversal direction Z.

Further, guiding wheels 78 can be provided, which are preferably arranged immediately near the travelling wheels 76 and which are supported (freely rotatable) on a vertical axis, parallel to the axis Y, in the example of FIG. 4. Optionally, the guiding wheels 78 can comprise a spring-loaded suspension for holding the shuttle 60 orientated within predetermined tolerances in the vertical plane XY.

Additionally, supporting wheels 79 can be provided, which are preferably arranged in a lower region of the carriage 62 oppositely to the travelling wheels 76. The supporting wheels 79 also rotate on vertical axes being orientated in parallel to the axis Y. The supporting wheels 79 prevent collision of the shuttle 60 (hangingly guided on one of the racks 30 in the example of FIG. 4) with the racks 30.

It is preferred to arrange all of the wheels 77, 78, and 79 on one side, preferably on the back, of the shuttle 60.

Further, a current tap 74 can be arranged at the carriage 62, which preferably has a vertical distance relative to the travelling wheels 76 representing an integer multiple of the height of one rack plane $E_i$. The overall height of the carriage 62 in the direction Y, for example, can be four times the height of one rack plane. The length of the carriage 62 in the direction X can vary, and preferably is in the range of the length of one storage location 46. The carriage 62 and the lifting carriage 68 are formed such that the storage units 50 can be stored and retrieved in the positive and negative transversal direction Z into and from the racks 30, which are limiting the corresponding rack aisle 36 laterally, in which the vehicle 60 is operated. FIGS. 4A and 4B clearly show that the containers 52 can also be moved in the negative transversal direction Z by means of the carriage 62, or through the lifting carriage 68, for storing/retrieving the containers 52 into and from the rack 30, on which the vehicle 90 shown in FIG. 4 hangs.

It is clear that instead of a current tap 74 another, not shown, energy accumulator (e.g., PowerCap) can be carried with, which is recharged again at charging stations especially provided for this purpose, preferably in the region of the handing-over locations 44 and the buffer locations 48.

The load-handling device 70 comprises prongs 101 which can be retracted and extended in the positive and negative transversal direction Z, wherein the prongs will be described in further detail below with reference to FIG. 5. Further, the load-handling device 70 can comprise a lateral guidance 90 which is implemented in the example of FIG. 4 in terms of two plate-like pushers 92-1 and 92-2, which in turn can be moved towards each other and away from each other in the longitudinal direction X for laterally securing storage units 50 and for guiding same during storage and retrieval processes.

Figure 5:
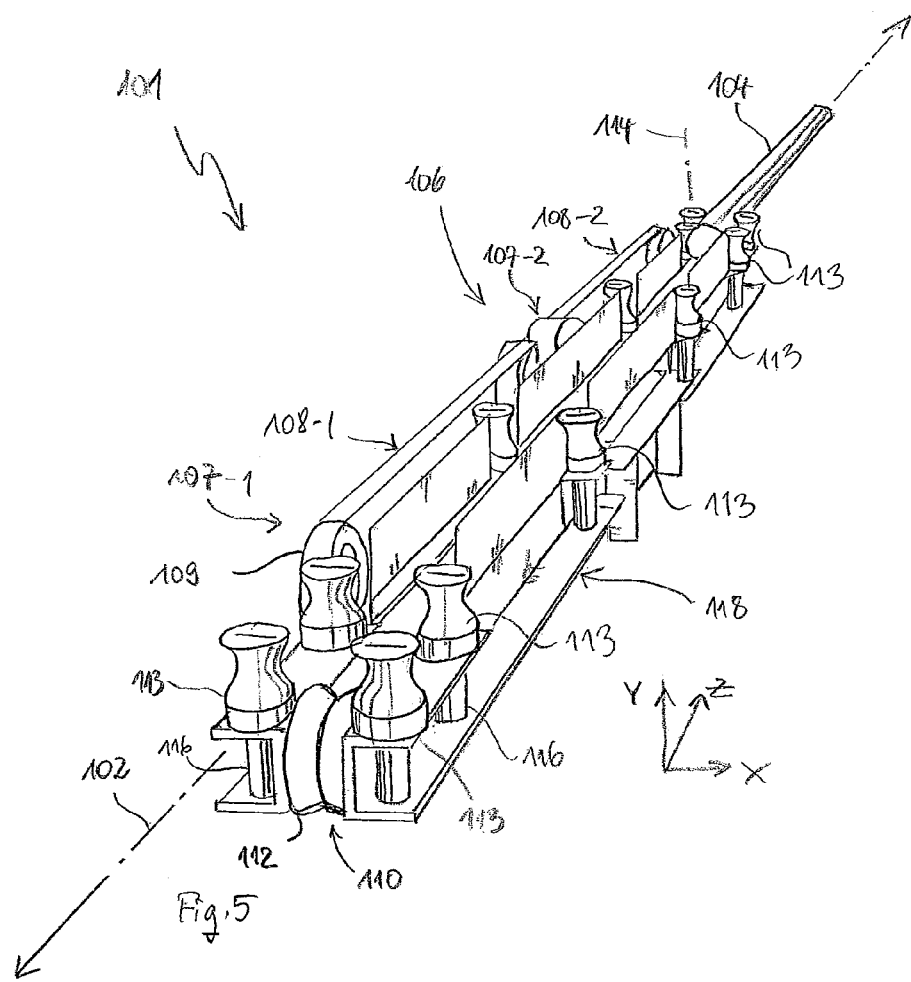
FIG. 5 shows a prong used with the vehicle of FIG. 4.

With reference to FIG. 5 one single prong 101 of a prong arrangement 100 (FIG. 6) is shown. Each of the prongs 101 is retractable and extendable in both positive and negative directions. The axis 102 is preferably orientated in parallel to the transversal direction Z in a mounted state of the load-handling device 70. The prong 101 comprises a rod 104 which preferably is made of carbon and has a length almost corresponding to the length of the load-handling device 70 (in the transversal direction Z). The length of the rod 104, and thus of the load-handling device 70, is dependent on whether a storage and retrieval is performed single-deep or multiple-deep.

Further, each of the prongs 101 can comprise a (transverse) conveyor 106, which consists in the example of FIG. 5 of two belt conveyors 108-1 and 108-2 arranged one behind the other and has respective drives 107-1 and 107-2. The belt conveyors 108 are orientated in parallel to the rod 104 and are arranged laterally thereto. In FIG. 5 the belt conveyors 108 are arranged on one side only. It is clear that the belt conveyors 108 can also be provided on both sides relative to the rod 104. The belt conveyors 108 can comprise pulleys 109, which have the drives 107 integrated. In this manner the belt conveyor 108 can be constructed in a space-saving manner and compact. The rod 104 is retracted and extended by means of one or more drives 110. The rod drive 110 can be formed, like the pulley 109, in terms of one or more integrated drive rollers 112. The cylindrical surface of the roller 112 is adapted to the shape of the rod 104 and preferably is coated for preventing the rollers 112 from spinning. The rollers 112 rotate on an axis, which preferably is orientated in parallel to the longitudinal direction X. Alternatively, the rods are connected to one more rope hoists, which are preferably wound several times around a drive roller for allowing driving the rods in a slip-free manner, wherein the rods are secured against dropping at the same time.

Beside (or instead of) the rollers 112, guiding rollers 113 are provided for the rod 104, which are arranged laterally to the axis 102 such that the rod 104 is guided coaxially relative to the axis 102. The guiding rollers 113 preferably rotate free on a respective axis 114 which preferably is orientated in parallel relative to the direction Y. It is clear that also the guiding rollers 113 can be driven, however typically the guiding rollers 113 are free-rotating. The guiding rollers 113 can be secured to a frame 118 by means of pins 116, which frame is exemplarily including two C-shaped profiles in the present case.

Figure 6:
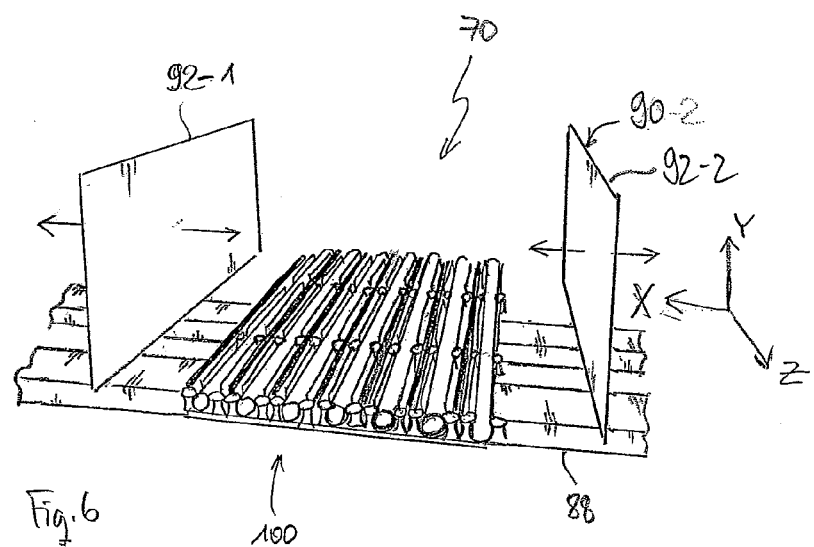
FIG. 6 shows a load-handling device, which is used with the vehicle of FIG. 4 and which comprises a prong arrangement having a plurality of prongs in accordance with FIG. 5.

With reference to FIG. 6 a perspective view of a prong arrangement 100 having a plurality of, preferably individually, retractable and extendable prongs 110 is represented in a mounted state. The prong arrangement 100 sits on the longitudinal supports 88 and is fixedly connected to these longitudinal supports 88. The plate-like pushers 92-1 and 92-2 of the lateral guidance 90 are shown in an extended state.

Figure 7:
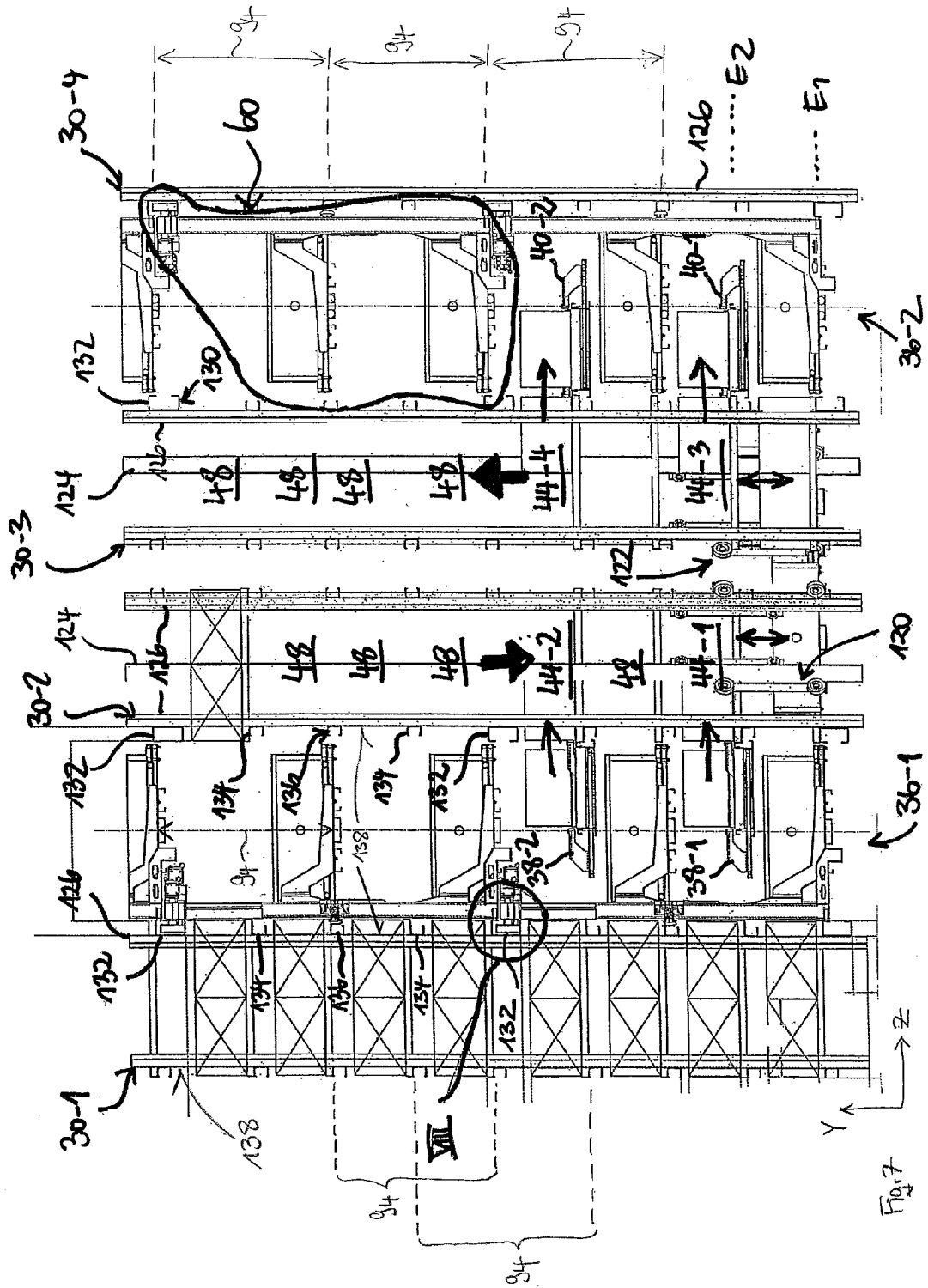
FIG. 7 shows another partial view of a front side of another rack arrangement in greater detail.

FIG. 7 shows a front view of a rack arrangement 18 similar to FIG. 3, but in greater detail. In FIG. 7 the rack aisles 36-1 and 36-2 are shown in the longitudinal direction X, which are defined between the racks 30-1 and 30-2, and between 30-3 and 30-4. The lifters 42 are indicated in terms of a storage elevator 122 in the rack 30-2 and a retrieval elevator 120 in the rack 30-3, which respectively move up and down in the vertical direction Y along a mast 124.

Further, two feeding conveyors 38-1 and 38-2 are shown in the rack aisle 36-1 at different heights for delivering storage units 50 in the transversal direction Z to handing-over locations 44-1 and 44-2, which are arranged oppositely in the rack 30-2. The storage elevator 122 retrieves the storage units 50 from there, transports the storage units 50 upwardly, and in turn delivers the storage units 50 in the transversal direction Z to free handing-over locations 48, which are arranged in the rack 30-2 above or beneath the handing-over locations 44-1 and 44-2.

During the retrieval the elevator 120 retrieves storage units 50 from the buffer locations 48, which are arranged in the third rack 30-3 above or beneath handing-over locations 44-3 and 44-4. The handing-over locations 44-3 and 44-4 couple to discharging conveyors 40-1 and 40-2. The discharging conveyors 40-1 and 40-2 are arranged in the rack aisle 36-2 at different height levels.

FIG. 7 is used for illustrating the, preferably one-sided, guidance of the shuttles 60 on respectively one of the racks 30-1 to 30-4. In FIG. 7 in an upper region of the second rack aisle 36-2 a shuttle 60 is surrounded by an auxiliary line for the sake of a simplified identification of one single shuttle 60. This shuttle 60 is supported in a hanging manner on the fourth rack 30-4, namely only on the fourth rack 30-4. The same applies with regard to the one-sided support of the other shuttles 60 shown in FIG. 7. In FIG. 7 no shuttle 60 is shown for the purpose of a better overview, the shuttle 60 operating the same rack planes $E_i$ like a shuttle 60 arranged at the same height. The shuttles 60 shown in the rack aisle 36-1 are respectively suspended on the first rack 30-1. The shuttles 60 shown in the second rack aisle 36-2 are respectively suspended on the fourth rack 30-4. Corresponding shuttles 60, which are not shown in FIG. 7, would be suspended in the rack aisle 36-1 on the second rack 30-2 and in the second rack aisle 36-2 on the third rack 30-3.

The shuttles 60 can be inserted into guidances, which are generally designated by 130, by means of their travelling wheels 76. The guidances 130 are mounted to rack uprights 126 of the racks 30 in a horizontal orientation in parallel to the rack aisles 36. Preferably, the guidances 130 are implemented by C-shaped profiles 132, which will be explained in more detail with reference to the FIGS. 8 and 9. Alternatively, also U-shaped, omega-shaped, or similarly shaped profiles can be used. Further, conventional longitudinal carriers 134 of the racks 30 are shown, which can also comprise a C-profile in cross section. The shelves can be placed, for example, on the longitudinal supports 134. However, the supports 134 can also be used as current guidances 136 interacting with the current taps 74 (cf. FIG. 4) for supplying the shuttles 60 electrically.

The guidances 130, the longitudinal supports 134, and the current guidances 136 in this sense are attached to the longitudinal sides 138 of the racks 30, which are defined by the free exterior surfaces of the racks 30.

Figure 8:
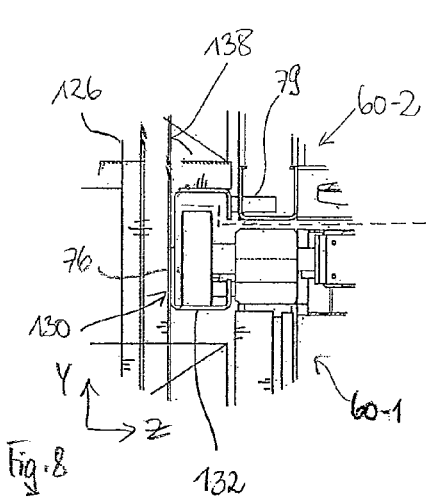
FIG. 8 shows an enlarged illustration of a vehicle suspension of FIG. 7.

With reference to FIG. 8 an enlargement of a region VIII in FIG. 7 is shown. In FIG. 8 the guidance 130 is represented in terms of a C-profile 132, into which a first (lower) shuttle 60-1 is inserted by means of the travelling wheel 76. The first lower shuttle 60-1 is located beneath the auxiliary line illustrated by means of a dashed line. A second upper shuttle 60-2 also interacts with the guidance 130 by means of the supporting wheel 79 thereof, which is arranged in an upper half of a second shuttle 60-2. The guidance 130 is used for both inserting the lower shuttle 60-1 and supporting the upper shuttle 60-2. The lower shuttle 60-1 is guided in an interior 138 of the C-shaped profile 132. The upper shuttle 60-2 is supported on an exterior 144 of the C-shaped profile 132.

Figure 9:
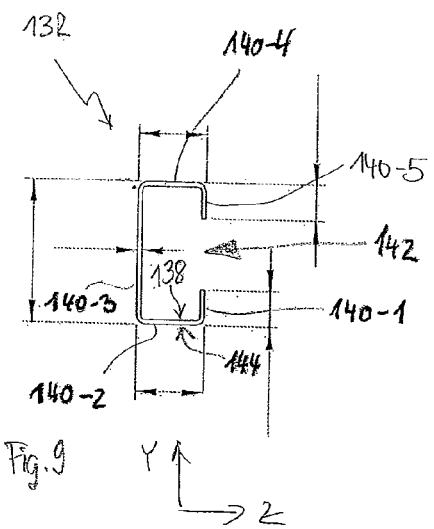
FIG. 9 shows a cross section of the guidance profile of FIGS. 7 and 8.

With reference to FIG. 9 an embodiment of a C-shaped profile 132 is shown in cross section, which can be manufactured, for example, by means of folding. The profile 132 can comprise several legs 140. In FIG. 9 the profile 132 comprises five legs 140-1 to 140-5. The C-profile defines an opening 142, which is orientated in FIG. 9 to the right (towards the rack aisle 36). The travel wheels 76 run in the interior 138 on the second leg 140-2. The supporting wheels 79 run on an exterior surface of the fifth leg 140-5, which is orientated vertically. The first leg 140-1 is not necessarily required, however is used for the lateral guidance of the shuttles 60 because there the guiding wheels 78 are in contact with the internal surface, as exemplarily shown in FIG. 8.

Figure 10:
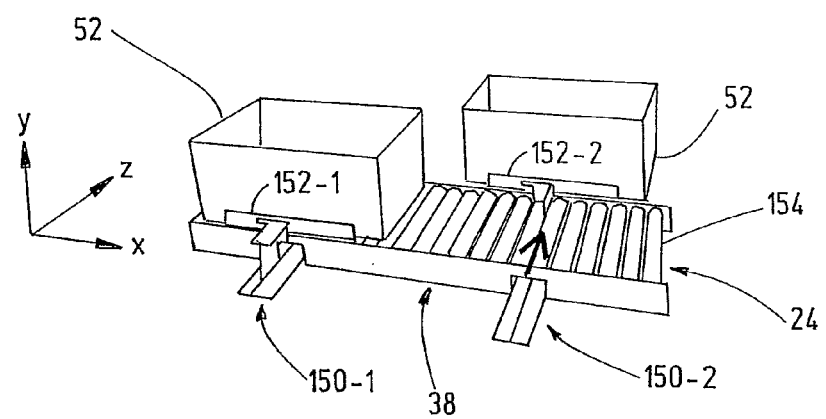
FIG. 10 shows a perspective illustration of two transferring devices within the region of a feeding conveyor.

FIG. 10 shows a perspective illustration of two transverse transferring devices 150-1 and 150-2. In the present case, a first pusher 152-1 and a second pusher 152-2 are shown. The pushers 152 are arranged such that they can be moved in the transversal direction Z through interstices 160, which are defined between adjacent rollers 154. The arrangement illustrated in FIG. 10 is used, for example, in the region of the feeding conveyor 38 of FIGS. 2 and 3, which is located oppositely to the handing-over locations 44.

Figure 11:
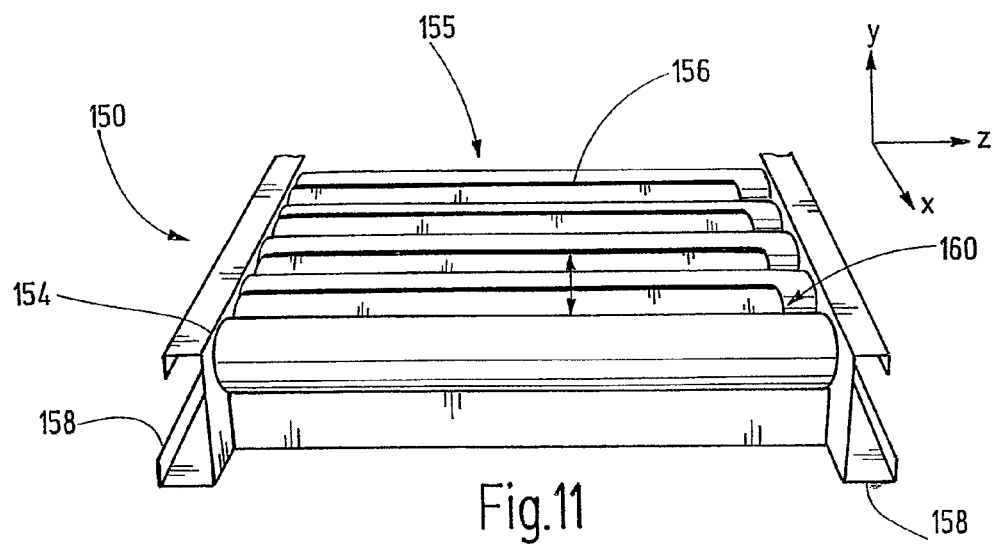
FIG. 11 shows a perspective view of a belt lifter, which is integrated into a roller conveyor.

Further, belt conveyors 156 in terms of a belt lifter 155 can also be used as the transverse transferring device 150, which in turn can be arranged in the interstices 160 between adjacent rollers 154, as exemplarily shown in FIG. 11. An advantage of this kind of transverse transferring device 150 is that the side 150 of the roller conveyor 28 does not need to be provided with slits like the transverse transferring device 150 of FIG. 10 for allowing the passage of the transverse transferring device 150 into the interstices 160.

The belt conveyors 156 can be lifted and lowered so that the storage units 50 can be conveyed, in a lowered position of the belt conveyors 156, over the rollers 154 in the longitudinal direction X, and can be conveyed away, in a lifted position of the belt conveyor 146, laterally in the transversal direction Z, for example, to one of the handing-over locations 44. The belt conveyors 156 can also reach across the width of the conveyor 38, or 40, so that they reach into the handing-over location(s) 44. Thus, a transverse transferring device 150 can extend across one of the conveyors 38/40, both conveyors 38/40, and the handing-over location(s) 44.

As a matter of fact, the other elements can also be used as the transverse transferring devices 150 such as chain-member belts having integrated rollers, wherein the rollers can be specifically activated or de-activated, in order to convey away storage units 50 laterally relative to the chain conveyor.

Figure 12:
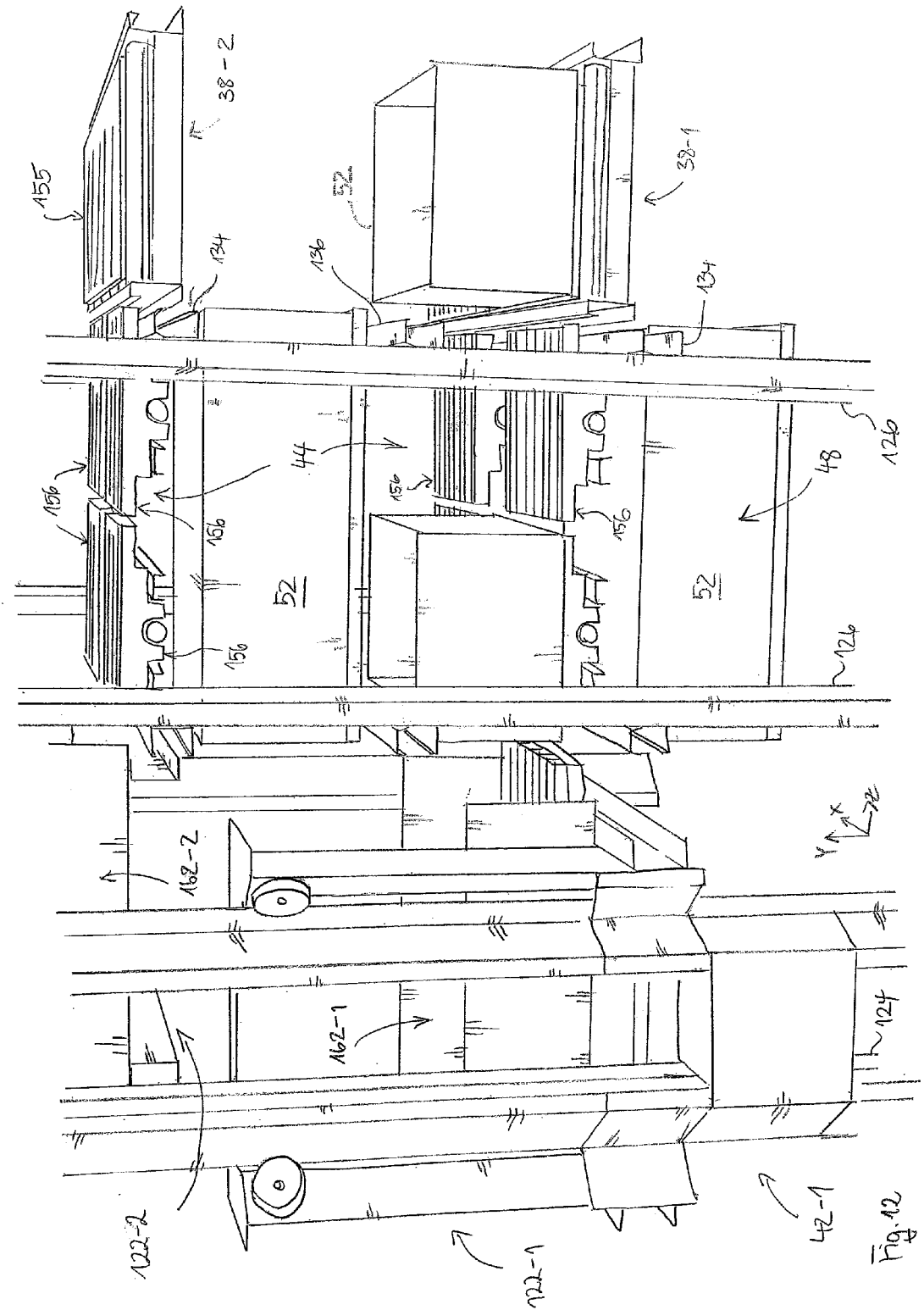
FIG. 12 shows a perspective illustration of a region of another rack arrangement showing in detail feeding conveyors at different heights, handing-over locations, and lifters.

With reference to FIG. 12 a perspective view in the longitudinal direction in a region of a rack arrangement 18 is shown, which comprises two lifters 42 in terms of a storage elevator 122, for handing-over locations 44, and two buffer locations 48, as well as two feeding conveyors 38-1 and 38-2 at different heights. The handing-over locations 44, which are respectively adapted for double-deep handling of storage units 50, are arranged at a distance relative to each other corresponding to the height of two rack planes in the vertical direction Y. The same applies with regard to the buffer locations 48. Each of the four handing-over locations 44 depicted in FIG. 12 comprises two belt conveyors 156 (without lifting functionality), which are arranged one behind the other in the transversal direction Z. The feeding conveyors 38-1 and 38-2 respectively comprise two belt lifters 155, which are arranged one behind the other in the longitudinal direction X and which in turn are arranged oppositely to the handing-over locations 44 in the transversal direction Z. For example, the belt lifters 155 are realized, in the present case, by belt conveyors including a lifting function.

Further, two load-handling devices 162-1 and 162-2 of the first and second storage elevators 122-1 and 122-2 are shown. The storage elevators 122-1 and 122-2 are arranged oppositely to the handing-over locations 44 and the buffer locations 48 in the transversal direction Z. It is clear that the same applies analogously with regard to the retrieval elevators.

Figure 13:
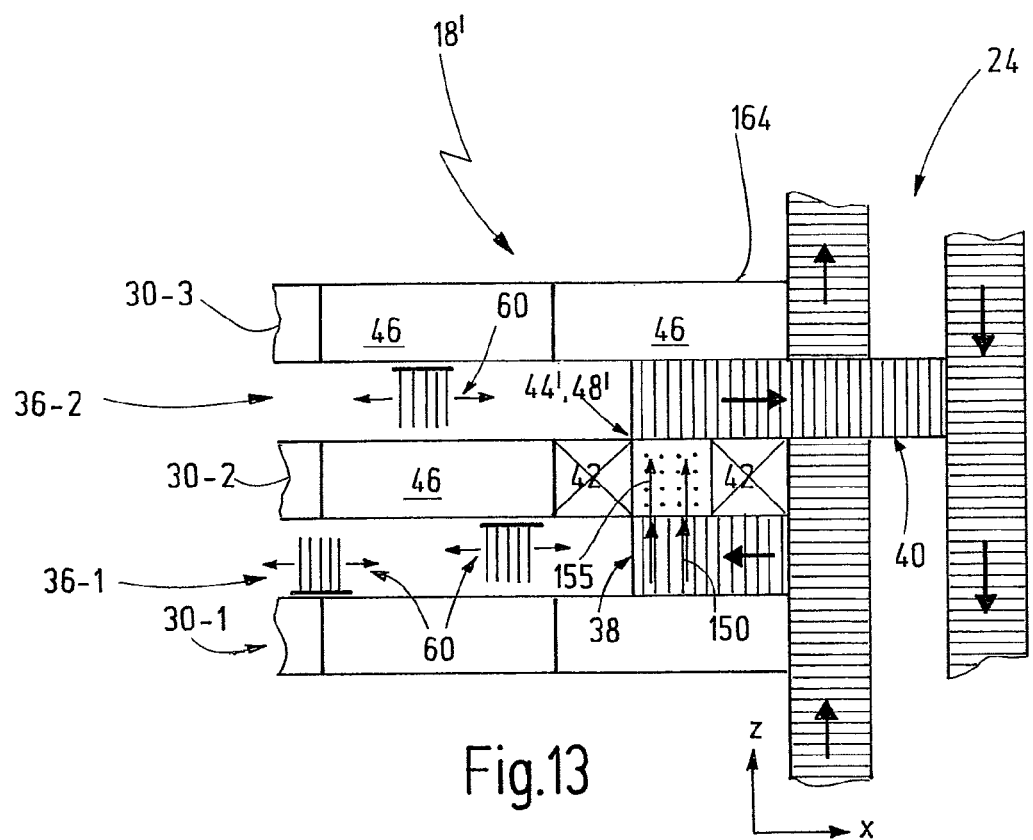
FIG. 13 shows a top view of another variation of a rack arrangement.

With reference to FIG. 13 in a top view of a modified rack arrangement 18' is shown.

Three single racks 30-1 to 30-3 are shown in FIG. 13, which define therebetween a first rack aisle 36-1 and a second rack aisle 36-2, in which in turn several shuttles 60 can be operated movable in the longitudinal direction X. The conveyor 24 is arranged at two different heights and can be separated (with regard to material flow) into a storage loop and a retrieval loop. Storage is conducted via the feeding conveyor 38, which is arranged at a lower height level. Retrieval is conducted via the discharging conveyor 40, which is arranged at a higher height level than the feeding conveyor 38. The conveying directions are indicated in FIG. 13 by means of dark arrows.

After a storage unit 50 has reached an end of the feeding conveyor 38 in the first rack aisle 36-1, which is arranged oppositely to the handing-over location 44' in the transversal direction Z, the storage unit 50 can be transferred onto the handing-over location 44' by means of a transverse transferring device 150 being indicated in FIG. 13 by means of a double arrow.

The handing-over location 44 is surrounded in the longitudinal direction X by two lifters 42, which can be used for storing and/or retrieving storage units 50. It is clear that buffer locations 48 are arranged beneath as well as above the handing-over locations 44', which are arranged at the height level of the feeding conveyor 38 and the discharging conveyor 40.

Figure 14A:
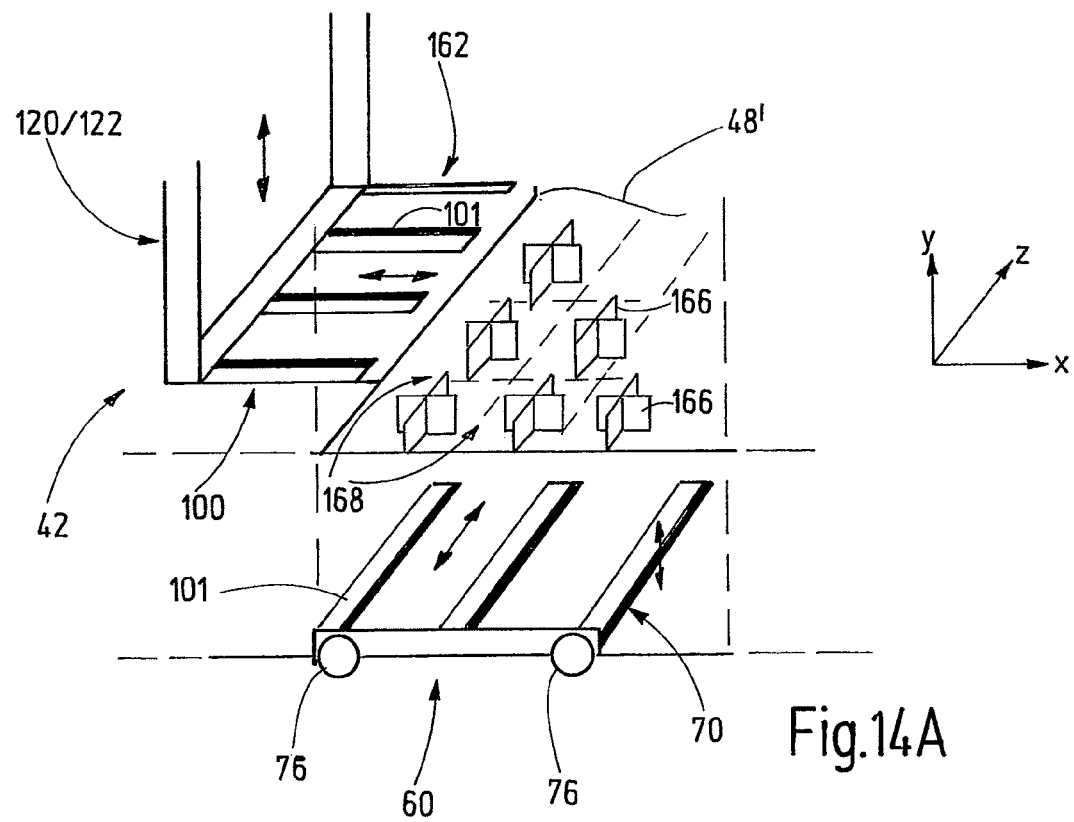
FIGS. 14A and 14B show a schematic perspective illustration of a buffer location and a handing-over location, as used with the arrangement of FIG. 13.

With reference to FIG. 14A a buffer location 48' is schematically indicated, as used in the rack arrangement 18' of FIG. 13. It is clear that the explanations below with regard to the buffer location 48' analogously apply to the handing-over locations 44' of FIG. 13, wherein the handing-over locations 44' merely distinguish from the buffer locations 48' in an additional conveyor such as a belt conveyor 155, was will be explained in more detail with reference to FIG. 14B.

Each of the buffer locations 48' is configured to interact in a meshing manner with the load-handling device 70 of the shuttles 60 and in a meshing manner with the load-handling devices 162 of the lifter 42 and the storage and retrieval elevators 120 and 122. For this purpose, the buffer location 48' can comprise, for example, a bottom on which the elevations 166 are arranged, preferably in the shape of a matrix. In FIG. 14A only some of the elevations 166 are illustrated. The elevations 166 can be realized, for example, by means of star-shaped uprights, leaving interstices 168 in the transversal direction Z as well as in the longitudinal direction X. For example, the rods 104 of the prong arrangement 100 of the lifter 42 as well as the rods 104 of the prong arrangement 100 of the load-handling device 70 of the shuttle 60 can engage the interstices 168 in the transversal direction Z.

In comparison to the rack arrangement 18 of FIG. 2 the exchange of storage units 50 between the feeding conveyor 38, the discharging conveyor 40, and the handing-over locations 44' is still conducted along the transversal direction Z. However, the exchange between the lifters 42 and the handing-over locations 44', or the buffer locations 48', happens in the longitudinal direction X. By this measure it is possible to integrate the lifters 42, the handing-over locations 44', and the buffer locations 48' into the same rack so that, on the one hand, double racks can be omitted and, on the other hand, the lifters 42 can be used for storage as well as for retrieval.

It is clear that only the handing-over locations 44' need to be provided with conveying-system components, which are exchanging the storage units 50 with the discharging conveyor 40. The handing-over location 44', which is arranged alone oppositely to the feeding conveyor 38, actually does not need a conveying system since the load-handling devices 162 of the lifters 42 can retrieve storage units 50 independently, which are placed there and which are to be stored, in that the prongs 101 extend into the interstices 168 in the longitudinal direction X, in that the load-handling device 162 is lifted subsequently so that the to-be-stored storage unit 50 is lifted, and in that the prongs 101 of the prong arrangement 100 of the load-handling device 162 of the lifter 42 is retracted sequentially, preferably while the belt conveyor 108 is operated at the same time for moving the to-be-stored storage unit 50 safely onto the load-handling device 162. Then, the lifter 42 can be moved in the vertical direction Y to the buffer location 48', where the to-be-stored storage unit 50 is delivered by means of the belt conveyor 108 so that the to-be-stored storage unit 50 sits on the elevations 166 of the buffer location 48'. If the lifter 42 moves to another buffer location 48', then the lifter 42 can pick up a to-be-retrieved storage unit 50 in the above-described manner from there, and can deliver same to the handing-over location 44' assigned to the discharging conveyor 40.

If the feeding conveyor 38 and the discharging conveyor 40 are located at the same height, the handing-over location 44' needs to be equipped with an additional conveying-system component such as a belt lifter 55 for moving the to-be-retrieved storage unit 50 onto the discharging conveyor 40. In this case, it is required to be able to lower the belt conveyor 155 that deep that the load-handling devices 162 of the lifter 42 do not collide with the belt lifter 155 during storage and retrieval of storage units 50.

Figure 14B:
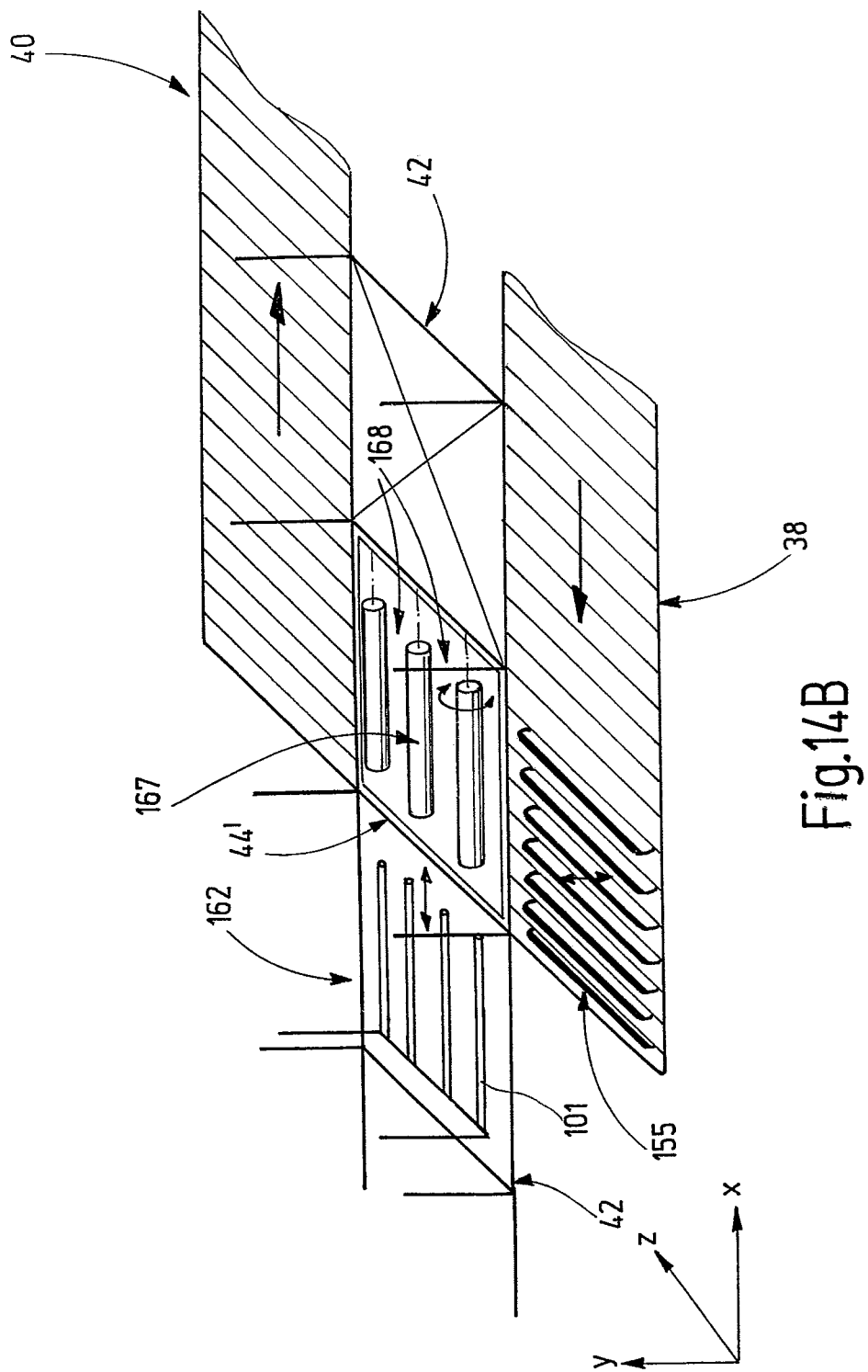

A handing-over location 44' is shown in FIG. 14B. The handing-over location 44' is located above or beneath the buffer location 48'. The handing-over location 44' is arranged oppositely to a feeding conveyor 38 and a discharging conveyor 40 in FIG. 14B. It is clear that the handing-over location 44' could also be arranged oppositely to the feeding conveyor 38, or the discharging conveyor 40 only, wherein in this case an additional handing-over location 44' were to be provided in the rack column, the additional handing-over location 44' interacting with the other conveyor 38 or 40.

The handing-over location 44' is equipped with a transverse transferring device 150 in terms of a roller comb 167. The roller comb 167 comprises a number of driven rollers, which are orientated in the longitudinal direction X and which can move the storage units 50 in the transversal direction Z. The rollers of the roller comb 167 are distanced to each other such that they define interstices 168 therebetween. The interstices 68 are arranged and dimensioned such that the prongs 101 of the load-handling device 162 of the lifter 42 can be retracted and extended into the roller comb 167 for picking up a storage unit 50.

During a storage process the storage units 50 are transported via the feeding conveyor 38 to the end thereof, where a transverse transferring device 150, for example, in terms of a belt lifter 155 is arranged. The belt lifter 155 is shown in FIG. 14B in a lifted position so that belts thereof can convey a storage unit 50 in the positive transversal direction Z from the feeding conveyor 38 onto the handing-over location 44', i.e. onto the rollers of the roller comb 167. The height of the conveying planes, which are defined by the belt lifter 155 and the roller comb 167, are adapted to each other and are preferably equal. While the storage unit 50 is handed over to the handing-over location 44' by the belt lifter 155, the handing over can be assisted by the driven rollers of the roller comb 167 in that the rollers are driven correspondingly. As soon as the storage unit 50 is placed on the rollers of the roller comb 167, the prongs 101 of the load-handling device 162 of the lifter 42, which is shown at the left in FIG. 14B, can be extended into the interstices 168 along the positive longitudinal direction X. As soon as the prongs 101 are positioned beneath the (not shown) storage unit 50, the lifter 42 can conduct a small lifting movement so that the storage unit 50 is separated from the roller comb 167. Subsequently, the prongs of the load-handling device 162 are again retracted in the negative longitudinal direction X for moving the load-handling device 162 of the lifter 42 to the height of a desired rack plane $E_i$.

During a retrieval process the load-handling device 162 retrieves the to-be-retrieved storage unit 50 from a buffer location 48', as exemplarily shown in FIG. 14A, and travels to the height of the handing-over location 44', as exemplarily shown in FIG. 14B. The belts of the load-handling device 162, which are not shown in FIG. 14B, are actuated so that the to-be-retrieved storage unit 50 is pushed by the load-handling device 162 of the lifter 42 in the positive longitudinal direction X onto the roller comb 167. As soon as the to-be-stored storage unit 50 is placed on the roller comb 167, the rollers of the roller comb 167 can be actuated such that the to-be-retrieved storage unit 50 is conveyed onto the discharging conveyor 40 in the positive transversal direction Z.

Figure 15:
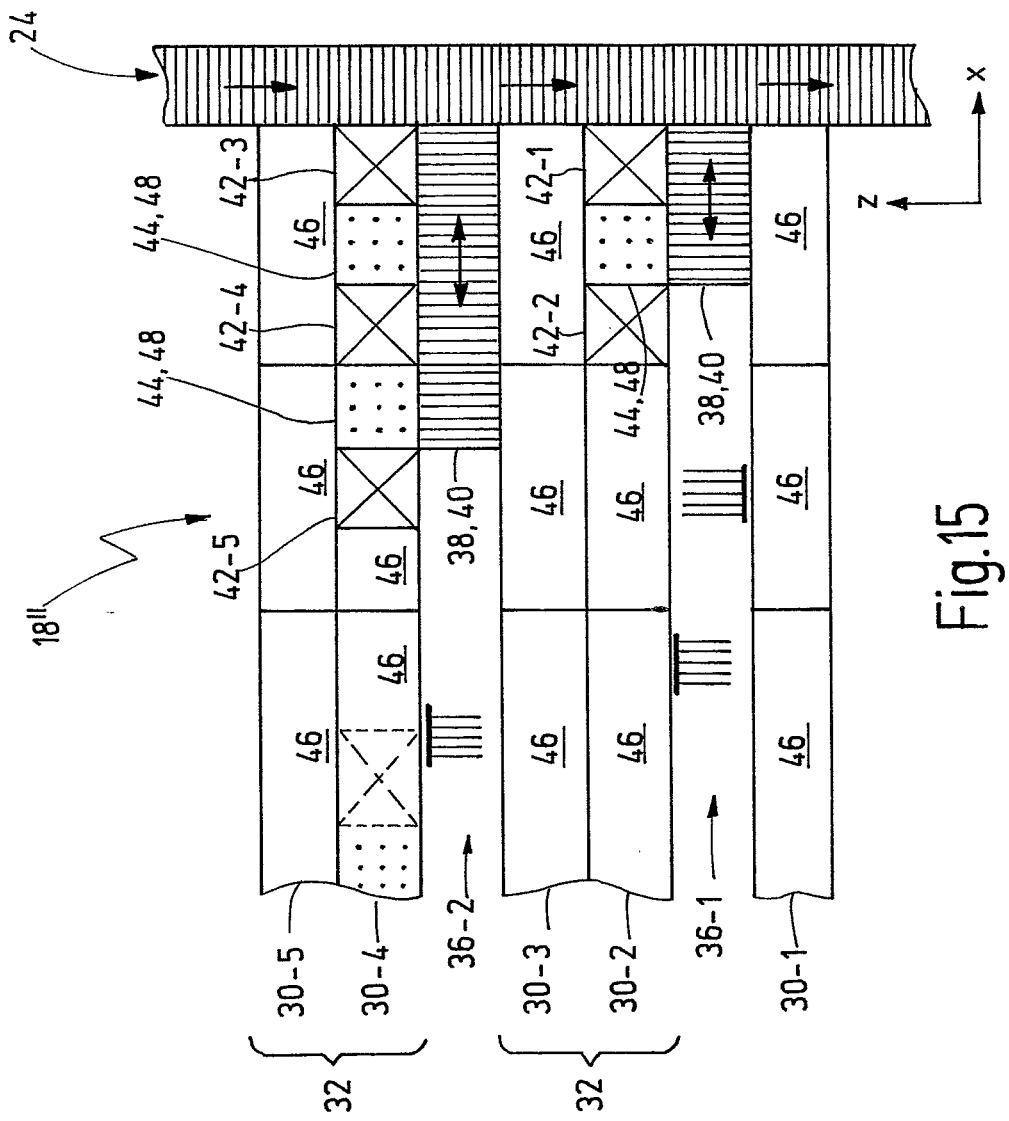
FIG. 15 shows a top view of another modification of a rack arrangement.

In FIG. 15 another modification of a rack arrangement 18" is shown, which conceptionally represents a fusion of the rack arrangements 18 (FIG. 2) and 18' (FIG. 13).

The rack arrangement 18" of FIG. 15 again comprises single racks 34 (30-1) and double racks 32 (30-2, 30-3 and 30-4, 30-5), wherein the lifters 42 are respectively provided in one rack 30 only, even if actually both racks 30 were provided with a double rack 32, in order to accommodate the lifters 42, the handing-over locations 44, and the buffer locations 48 in the racks 30.

In the rack 30-2 a function unit consisting of two lifters 42-1 and 42-2 as well as of at least one handing-over location 44 and at least one buffer location 48 is provided. It is clear that, as before, each of the rack planes $E_i$ is supplied with storage units 50 via at least one buffer location 48. Preferably, each of the rack planes $E_i$ has assigned a separate buffer location 48. The conveying system, which is provided in the rack aisle 36-1, can be operated as both a feeding conveyor 38 and a discharging conveyor 40.

The same applies with regard to the conveying system in the rack aisle 36-2 which, however, reaches, in comparison, slightly deeper into the rack aisle 36-2 in the longitudinal direction X. The conveying system reaches deeper into the rack aisle 36-2 for supplying two handing-over locations 44 in the rack 30-4 with storage units 50. Both of the handing-over locations 44 in the rack 30-4 can be surrounded by two lifters 42 respectively. The handing-over location 44 in the rack 30-4, which is located next to the front, is surrounded by the two lifters 42-3 and 42-4. The second handing-over location 44 in the rack 30-4, which is located deeper within the rack aisle 36-2, is surrounded by the two lifters 42-4 and 42-5. The lifter 42-4 exchanges storage units 50 preferably with both of the handing-over locations 44 in the rack 30-4, namely in the longitudinal direction X. Additional lifters 42 and handing-over locations 44, or buffer locations 48, can be arranged in the rack 30-4 with an increasing depth of the rack aisle, as indicated by means of phantom lines. In this case, the conveying system needs to reach into the rack aisle 36-2 sufficiently far.

Further, it is clear that additional pairs of lifters 42 and handing-over locations 44, or transfer locations 48, can be arranged additionally, or alternatively, in such racks which do not comprise such function groups in FIG. 15, such as the racks 30-3 and 30-5. The lifters 42 can also be used exclusively unidirectional for storing or retrieving only, instead of bidirectional for storing and retrieving. The load-handling devices 162 of the lifters 42 can further be modified so that they can exchange storage units 50 in the longitudinal direction X as well as in the transversal direction Z. In this case, the conceptional possibilities are almost unlimited, if besides a storage-unit exchange within one and the same rack also an exchange with adjacent racks can occur.

If the concept of the rack arrangement 18" of FIG. 15 is expanded by one or more, preferably independent from each other, conveying system planes, then the performance can be scaled almost arbitrarily. The narrow passage, with regard to material flow, of the front-side lift is omitted. Several shuttles 60 can simultaneously access storage locations in the same rack plane $E_i$. Based on a suitable selection of storage and retrieval strategies the load-handling devices 70 can be used, provided that the shuttles 60 respectively comprise several load-handling devices 70, for storing and retrieving a corresponding number of storage units 50 at the same time. This means that during a stop of the shuttle 60 in the rack plane 36 several storage units 50 are stored and/or retrieved at the same time. The likelihood that several storage units 50 can be exchanged during a stop of the shuttle 60 at the same time is increased if the load-handling device 70 can be moved independently to each other, as already explained above with regard to the lift in the vertical direction Y. In this case, the distance of the load-handling devices 70 can be varied from the rigid height of two rack planes between the heights of one rack plane or three rack planes (at an overall height of four rack planes of the shuttle 60). The likelihood can be increased additionally, if the load-handling devices 70 of the shuttles 60 are respectively equipped with a longitudinal drive. In this case, each of the load-handling devices 70 can travel, similar to a displacement cart, additionally in the longitudinal direction X while the associated shuttle 60 is at rest.

Another advantage of the invention is to be seen in the sequencing which is particularly important with regard to retrieval processes. The selection of a rack plane $E_i$, from which a storage unit 50 is to be retrieved, represents a first sequencing stage. The selection of the shuttle 60, which retrieves the to-be-retrieved storage unit 50 from the selected warehouse plane $E_i$, represents the next sequencing stage. The selection of the buffer location 48, to which the shuttle 60 delivers the to-be-retrieved storage unit 50, represents the third sequencing stage. Since the at least one load-handling device 70 of the shuttle 60 is equipped with a lift, the rack planes $E_i$ and the buffer location 48 can be selected. The fourth sequencing stage represents the selection of the lifter 42 which retrieves the to-be-retrieved storage unit 50 from the selected buffer location 48. A fifth sequencing stage is represented by the selection of the handing-over location 44, to which the selected lifter 42 delivers the to-be-retrieved storage unit 50.

If one considers that several shuttles 60 in each rack aisle 36, and several lifters 42 in each rack (row) 30, are provided, or can be provided, it is easily understandable which enormous potential in the invention lies. Thus, the to-be-retrieved storage unit 50 can be handed over, for example, already in the desired sequence, i.e. in a sequenced manner, from the discharging conveyor 40 to the conveyor 24, in order to be conveyed to the shipping station/packaging station 22. Such a course of procedure is particularly advantageous if the storage units 50 are delivered to a (not shown) packaging robot which packs the storage units 50 in accordance with a predetermined packing pattern onto a shipping carrier such as a Europool pallet.

Figure 16:
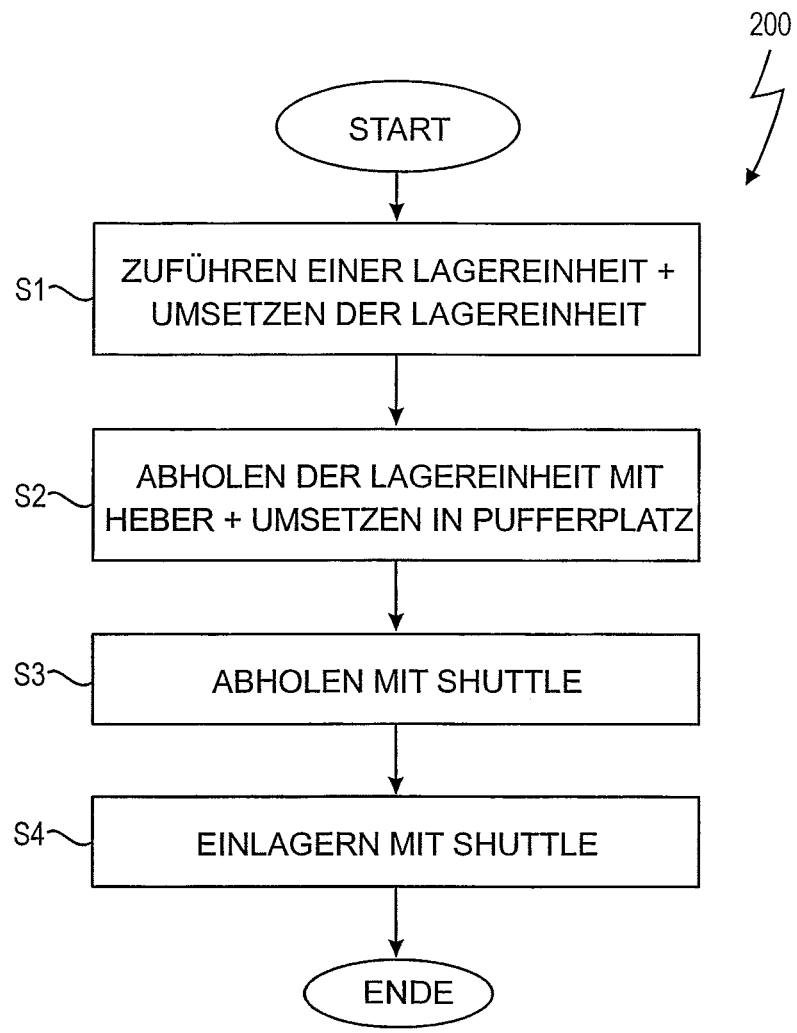
FIG. 16 shows a flow chart of a storing method in accordance with the invention.

In FIG. 16 a flowchart 200 of a method for storing the storage units 50 into a rack 30 having several rack planes $E_i$ is shown, which are arranged on top of each other and which respectively comprise several storage locations 46 arranged side by side, wherein the storage is conducted via a feeding/discharging conveyor 38, 40 reaching into a rack aisle 36 and coupling to at least one handing-over location 44, wherein each of the rack planes $E_i$ is operated by at least one load-handling device 70 of a vehicle 60, wherein the method comprises the following steps: feeding (step S1) a storage unit 50 via a feeding conveyor 38; moving the fed storage unit 50 from the feeding conveyor 38 to the handing-over location 44 in a transversal direction Z by means of a transverse transferring device 150 which can be moved into a conveying path of the feeding conveyor 38; retrieving (step S2) the storage unit 50 from the handing-over location 44 in a longitudinal direction X, or in the transversal direction Z, by means of a rack-integrated lifter 42 in that a load-handling device 162 of the lifter 42 is extended horizontally into the handing-over location 44, is subsequently lifted vertically, and is horizontally retracted subsequently, preferably while a conveyor 106 is actuated at the same time, which is part of the load-handling device 162 of the lifter 42; moving the retrieved storage unit 50 in the vertical direction X by means of the rack-integrated lifter 42; delivering the retrieved storage unit in the longitudinal direction X, or the transversal direction Z, to a buffer location 48 located above or beneath the handing-over location 44, wherein the buffer location 48 is assigned to a storage rack plane, wherein the buffer location 48 is arranged at the height of the storage rack plane, or adjacent thereto, in that the conveyor 106 of the load-handling device 162 of the lifter 42 is operated as soon as the lifter 42 has reached the height of the buffer location 48; retrieving (step S3) the storage location 50 from the buffer location 48 by means of one of the vehicles 60 in that the vehicle 60 travels horizontally in the rack aisle along the rack 30 to a rack column, which comprises the handing-over location 44 and the buffer location 48, and in that a load-handling device 70 of the vehicle 60, if necessary, is moved vertically to the height of the buffer location 48, and in that the load-handling device 70 of the vehicle 60 is then horizontally extended, vertically lifted, and subsequently retracted again, preferably while a conveyor 106, which is part of the load-handling device 70 of the vehicle 60, is operated at the same time; moving the vehicle 60 in a horizontal direction Z to another rack column, which comprises a storage location, and, if necessary, vertically moving the load-handling device 70 of the vehicle 60 to the height of the storage location; and operating (step S4) the conveyor 106 of the load-handling device 70 of the vehicle 60 such that the storage unit 50 is displaced onto, or into, the storage location.

Instead of "classic" lifters 42, where the load-handling devices 162 are moved up and down along mast-like elements, also paternoster elevators can be used, which are preferably operated only in one direction. This means that the paternoster conveys only upwardly or only downwardly.

The shuttles 60 can also be operated in a "roaming" mode. During roaming the shuttles can be transferred (vertically) between modules 54 in that corresponding shuttle elevators, or shuttle lifters, are provided. In this sense, not each of the modules 54 needs to be equipped with shuttles 60 at maximum. The shuttles can rather change between the modules on demand.

Preferably each of the racks 30 comprises the same number of rack planes $E_i$, or modules 54, which respectively comprise the identical vertical partitioning.

Even if shuttles 60, which overlap each other, have been described above always as being arranged at the identical height (by means of the travelling rails 132 thereof), it is clear that the overlapping shuttles 60, or the travelling rails 132 thereof, can be arranged in a vertically displaced manner at oppositely arranged longitudinal sides 138 of the rack aisle 36. This kind of arrangement is particularly advantageous in the region of the feeding and discharging conveyors 38 and 40. Additionally, the shuttles 60 can be formed differently high. This is in turn particularly advantageous in the region of the conveyors 38 and 40, if there, for example, one module 54 (including a correspondingly adapted shuttle 60) is defined, which includes, for example, only two rack planes $E_i$, whereas the remaining modules 54 include, for example, four rack planes $E_i$.

Order picking stations, packaging stations, or similar working stations can directly follow to the rack arrangements 18, as described in FIGS. 2, 13 and 15, and preferably directly to such racks which are located externally, such as the rack 30-1.

Individual rack aisles 36 can be connected via conveying system components, which are substantially orientated in the transversal direction Z and extend, for example, through the racks 30, being in direct communication, with regard to material flow, for allowing an exchange of storage units 50 in an aisle-overlapping manner without utilizing the lifters 42.

In the above-given description of the figures the selection of the orientation of the coordinate system has been in general accordance with the typical designations used in the field of intralogistics so that the longitudinal direction of a rack 30 is designated by X, the depth of the racks 30 (or the transversal direction of a SRD) is designated by Z, and the (vertical) height of the rack 30 is designated by Y.

Further, identical parts and features have been provided with the identical reference numerals. The disclosure contained in the description is to be transferred roughly to identical parts and feature having the same reference numerals. Position and orientation indications (e.g., "above", "below", "lateral", "longitudinal", "transversal", "horizontal", "vertical", and the like) refer to the immediately described figure. If the positional orientation is changed, these indications are to be transferred roughly to the new position and orientation.

Therefore, what we claim is:

1. A system for storing and picking storage units in an automated manner, comprising:
   a rack arrangement having a plurality of racks, wherein each of the racks comprises several rack planes arranged on top of each other which in turn respectively include a plurality of storage locations arranged side by side, wherein a rack aisle is defined between first and second ones of the racks, and wherein the racks end at respective front sides which are disposed in a plane perpendicular to the racks;
   a plurality of rack-bound vehicles each configured to travel in the rack aisle for storing and retrieving the storage units into and from the storage locations in a transversal direction of the racks, wherein each of the vehicles respectively comprises: a chassis; at least one travel drive; and at least one vehicle load-handling device; wherein several ones of the vehicles are provided in the rack aisle such that each of the rack planes is operated by the at least one vehicle load-handling device of one of the vehicles;
   at least one rack-integrated lifter integrated within a respective rack inwardly of the front side of the rack, the rack-integrated lifter including a lifter load-handling device, wherein the lifter load-handling device of the rack-integrated lifter is configured to transfer the storage units between a rack-integrated handing-over location, which is assigned to the at least one rack-integrated lifter, and at least one rack-integrated buffer location, wherein the at least one rack-integrated buffer location is arranged only vertically beneath, or only vertically above, the handing-over location;
   at least one conveyor system comprising a feeding/discharging conveyor, the at least one conveyor system protruding into the rack aisle by means of the feeding/discharging conveyor being arranged to couple to the handing-over location and which conveys to-be-stored storage units towards the handing-over location and conveys to-be-retrieved storage units away from the handing-over location; and
   at least one first transverse-transferring device which is arranged and configured to exchange the storage units between the feeding/discharging conveyor and the handing-over location.

2. The system of claim 1, wherein each of the vehicles further comprises at least one lifting carriage having a lifting drive respectively assigned thereto, wherein the lifting carriage is vertically and movably supported by the chassis, and wherein the assigned lifting drive moves the lifting carriage vertically.

3. The system of claim 2, wherein each of the vehicles is configured to travel along the racks in a horizontal guidance being mounted to the racks and wherein the at least one vehicle load-handling device of each of the vehicles is horizontally attached, in a cantilevered manner, to the lifting carriage, which is substantially orientated vertically so that the vehicles, which are arranged oppositely in the rack aisle at an identical height, cross during a longitudinal travel although the chassis of the vehicles, which are arranged oppositely at the identical height, vertically overlap during the crossing.

4. The system of claim 3, wherein the horizontal guidance is mounted to only one of the first rack and the second rack.

5. The system of claim 3, wherein the respective horizontal guidances are arranged at identical heights along longitudinal sides of the oppositely arranged first and second racks.

6. The system of claim 3, wherein each of the horizontal guidances comprises a profile, which is mounted in a horizontal longitudinal direction of the rack aisle to vertical rack uprights of the racks, which are facing the rack aisle.

7. The system of claim 6, wherein each of the guidances comprises a C-shaped profile, wherein one or more travelling wheels of one of the vehicles travel in an interior of the C-shaped profile, and wherein one or more supporting wheels of one of the vehicles, which is arranged vertically adjacent in the respective rack aisle, are guided along an exterior of the C-shaped profile.

8. The system of claim 1, wherein the chassis comprises a frame and at least one travelling wheel, which is coupled to the travel drive, and at least one supporting wheel wherein the at least one travelling wheel is arranged in an upper half of the chassis, and wherein the at least one supporting wheel is arranged in a lower half of the chassis.

9. The system of claim 8, wherein the at least one travelling wheel rotates on a horizontally orientated axis, and wherein the at least one supporting wheel rotates on a vertically orientated axis.

10. The system of claim 1, wherein the at least one rack-integrated lifter is arranged in a second rack in a first rack column, which is arranged adjacent to a second rack column in the second rack, wherein the handing-over location and the least one buffer location are arranged in the second rack column.

11. The system of claim 10, wherein an additional rack-integrated lifter is arranged in a third rack column of the second rack, which is arranged adjacent to the second rack column in the longitudinal direction.

12. The system of claim 10, wherein the handing-over location and the at least one buffer location are adapted to mesh with the lifter load-handling device of the at least one rack-integrated lifter in the longitudinal direction.

13. The system of claim 10, wherein the at least one buffer location is further configured to mesh with the vehicle load-handling devices of the vehicles in the transversal direction.

14. The system of claim 10, wherein the handing-over location comprises a second transverse transferring device, which is configured to move the storage units in the transversal direction collision-free with the lifter load-handling device of the at least one rack-integrated lifter.

15. The system of claim 1, wherein the at least one rack-integrated lifter is arranged in a third rack, which is arranged back-to-back to the second rack, wherein the handing-over location and the at least one buffer location are arranged in the second rack and are arranged oppositely to the at least one rack-integrated lifter in the third rack in the transversal direction.

16. The system of claim 15, wherein the handing-over location and the at least one buffer location are configured to mesh with the lifter load-handling device of the at least one rack-integrated lifter and with the vehicle load-handling devices of the vehicles in the transversal direction.

17. The system of claim 15, wherein, in the third rack, at least one additional lifter is arranged, which is arranged oppositely to one additional handing-over location and to at least one additional buffer location in the second rack.

18. The system of claim 1, wherein each of the transverse-transferring devices is one of a belt lifter, a roller comb, and a pusher.

19. The system of claim 1, wherein each of the vehicle load-handling devices comprises prongs, which are retractable and extendable in a horizontal direction, and lateral conveyors.

20. The system of claim 19, wherein the prongs are configured to be retracted and extended individually.

21. The system of claim 1, wherein the storage locations are configured to mesh with the vehicle load-handling devices of the vehicles in the transversal direction.

22. The system of claim 1, wherein each of the rack planes of one of the racks, wherein the one of the racks comprises at least one of the rack-integrated lifters, comprises one of the handing-over location and the buffer location.

* * * * *